(12) United States Patent
Martin

(10) Patent No.: US 12,200,586 B2
(45) Date of Patent: Jan. 14, 2025

(54) TELECOMMUNICATIONS APPARATUS AND METHODS

(71) Applicant: Sony Group Corporation, Tokyo (JP)

(72) Inventor: Brian Alexander Martin, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/240,201

(22) Filed: Apr. 26, 2021

(65) Prior Publication Data

US 2021/0250742 A1 Aug. 12, 2021

Related U.S. Application Data

(63) Continuation of application No. 15/553,227, filed as application No. PCT/EP2016/054822 on Mar. 7, 2016, now Pat. No. 10,993,098.

(30) Foreign Application Priority Data

Mar. 31, 2015 (EP) ..................................... 15161906

(51) Int. Cl.
*H04W 4/70* (2018.01)
*G06F 21/62* (2013.01)
(Continued)

(52) U.S. Cl.
CPC .......... *H04W 4/70* (2018.02); *G06F 21/6218* (2013.01); *H04W 16/26* (2013.01); *H04W 48/12* (2013.01);
(Continued)

(58) Field of Classification Search
CPC ....... H04W 4/70; H04W 16/26; H04W 48/12; H04W 72/042; H04W 72/044;
(Continued)

(56) References Cited

U.S. PATENT DOCUMENTS 6,628,946 B1 9/2003 Wiberg et al.
9,642,021 B2 5/2017 Siomina et al.
(Continued)

FOREIGN PATENT DOCUMENTS

EP 3582535 A1 * 12/2019 ............ H04W 24/02
GB 2487757 A 8/2012
(Continued)

OTHER PUBLICATIONS

International Search Report issued Jun. 20, 2016 in PCT/EP2016/054822 filed Mar. 7, 2016.
(Continued)

*Primary Examiner* — Charles N Appiah
*Assistant Examiner* — Frank E Donado
(74) *Attorney, Agent, or Firm* — XSENSUS LLP

(57) ABSTRACT

A method of operating a terminal device in a wireless telecommunications network is described. The method comprised; receiving a system information block containing a list of a plurality of different values of a parameter used in the wireless telecommunication network; determining one or more parameter values in the list which is supported within the terminal device; and receiving a system information block associated with the one or more supported parameter values from one or more other system information blocks associated with non-supported parameter values.

19 Claims, 12 Drawing Sheets

(51) Int. Cl.
*H04W 16/26* (2009.01)
*H04W 48/12* (2009.01)
*H04W 72/044* (2023.01)
*H04W 72/23* (2023.01)
*H04W 84/04* (2009.01)
*H04W 88/02* (2009.01)
*H04W 4/90* (2018.01)

(52) U.S. Cl.
CPC ......... *H04W 72/044* (2013.01); *H04W 72/23* (2023.01); *G06F 2221/2111* (2013.01); *G06F 2221/2117* (2013.01); *H04W 4/90* (2018.02); *H04W 84/042* (2013.01); *H04W 88/02* (2013.01)

(58) Field of Classification Search
CPC ..... H04W 4/90; H04W 84/042; H04W 88/02; H04W 72/23; G06F 21/6218; G06F 2221/2111; G06F 2221/2117
See application file for complete search history.

(56) References Cited

U.S. PATENT DOCUMENTS

| | | | |
|---|---|---|---|
| 2003/0174674 A1 | 9/2003 | Lee et al. | |
| 2007/0049344 A1* | 3/2007 | Van Der Velde | H04W 48/12 455/560 |
| 2008/0267309 A1 | 10/2008 | Saini et al. | |
| 2011/0263252 A1* | 10/2011 | Saini | H04W 48/16 455/434 |
| 2012/0044910 A1* | 2/2012 | Maeda | H04W 48/12 370/332 |
| 2012/0176951 A1* | 7/2012 | Pradas | H04W 74/006 370/312 |
| 2012/0322447 A1 | 12/2012 | Ramachandran et al. | |
| 2013/0136098 A1 | 5/2013 | Li et al. | |
| 2013/0165120 A1* | 6/2013 | Nylander | H04W 8/08 455/436 |
| 2013/0235785 A1* | 9/2013 | Sebire | H04W 36/0085 370/312 |
| 2013/0288694 A1* | 10/2013 | Mochizuki | H04W 72/04 455/450 |
| 2013/0301492 A1* | 11/2013 | Ji | H04L 5/0096 370/280 |
| 2014/0044023 A1 | 2/2014 | Kazmi et al. | |
| 2014/0198685 A1 | 7/2014 | Xu et al. | |
| 2014/0198726 A1 | 7/2014 | Xu et al. | |
| 2014/0204866 A1 | 7/2014 | Siomina et al. | |
| 2014/0293908 A1 | 10/2014 | Kumar et al. | |
| 2014/0334372 A1 | 11/2014 | Vos | |
| 2015/0172977 A1 | 6/2015 | Koc et al. | |
| 2015/0181575 A1 | 6/2015 | Ng et al. | |
| 2015/0257173 A1* | 9/2015 | You | H04W 74/006 370/330 |
| 2015/0382284 A1* | 12/2015 | Brismar | H04W 28/085 370/329 |
| 2016/0073302 A1 | 3/2016 | Yang et al. | |
| 2016/0073326 A1* | 3/2016 | Vannithamby | H04W 48/12 370/312 |
| 2016/0080991 A1 | 3/2016 | Harris et al. | |
| 2016/0165579 A1 | 6/2016 | You et al. | |
| 2016/0212663 A1 | 7/2016 | Uemura et al. | |
| 2016/0212664 A1 | 7/2016 | Uemura et al. | |
| 2016/0262030 A1 | 9/2016 | Dhanapal et al. | |
| 2017/0079063 A1* | 3/2017 | Koskinen | H04W 4/70 |
| 2017/0105166 A1* | 4/2017 | Lee | H04W 48/12 |
| 2017/0311309 A1* | 10/2017 | Fujishiro | H04L 5/0062 |
| 2018/0152872 A1 | 5/2018 | Wirtanen et al. | |
| 2021/0127330 A1* | 4/2021 | Höglund | H04W 4/70 |

FOREIGN PATENT DOCUMENTS

| | | |
|---|---|---|
| GB | 2487780 A | 8/2012 |
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |
| GB | 2488513 A | 9/2012 |
| GB | 2497742 A | 6/2013 |
| GB | 2497743 A | 6/2013 |
| WO | 2013/093436 A1 | 6/2013 |
| WO | 2013/093437 A1 | 6/2013 |
| WO | 2014/087145 A1 | 6/2014 |
| WO | 2014/087148 A1 | 6/2014 |

OTHER PUBLICATIONS

ETSI TS 122 368 V11.6.0 (Sep. 2012), "Digital cellular telecommunications systems (Phase 2+); Universal Mobile Telecommunications System (UMTS); LTE; Service requirements for Machine-Type communications (MTC); Stage 1," 3GPP TS 22.368 version 11.6.0 Release 11, 2012, 21 pages.

Holma, Harri et al., "LTE for UMTS OFDMA and SC-FDMA Based Radio Access," John Wiley and Sons, 2009, 4 pages.

ETSI TS 136 331 V11.4.0 (Jul. 2013), "LTE; Evolved Universal Terrestrial Radio Access (E-UTRA); Radio Resource Control (RRC); Protocol specification," 3GPP TS 36.331 version 11.4.0 Release 11, 2013, 350 pages.

Sony, "SIB scheduling for MTC," 3GPP Draft; R2-150184 MTC SIBS, 3rd Generation Partnership Project (3GPP), Mobile Competence Centre, vol. RAN WG2, No. Athens, Greece, Feb. 2015, XP050935530, 6 pages.

Sony, "SIB scheduling for MTC," 3GPP Draft; R2-151077 MTC SIBS, 3rd Generation Partnership Project (3GPP), Mobile Competence Centre, vol. RAN WG2, No. Bratislava, Slovakia, Apr. 2015, XP050952895, 4 pages.

Ericsson, "Revised WI: Further LTE Physical Layer Enhancements for MTC," 3GPP Draft; RP-141865, Revised WI on Further LTE Physical Layer Enhancements for MTC, 3rd Generation Partnership project (3GPP), Mobile Competence Centre, vol. TSG RAN, No. Edinburgh, Scotland, Dec. 2014, XP050898582, 8 pages.

Nokia Networks et al., "SIB Scheduling for MTC," 3GPP Draft; R2-150131 SIB Scheduling for MTC, 3rd Generation Partnership Project (3GPP), Mobile Competence Centre, vol. RAN WG2, No. Athens, Greece, XP050935485, 3 pages.

* cited by examiner

TELECOMMUNICATIONS APPARATUS AND METHODS

CROSS-REFERENCE TO RELATED APPLICATIONS

This application is a continuation of U.S. application Ser. No. 15/553,227, filed Aug. 24, 2017, which is based on PCT filing PCT/EP2016/054822, filed on Mar. 7, 2016, and claims priority to EP 15161906.1, filed on Mar. 31, 2015, the entire contents of each are incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The present disclosure relates to wireless telecommunications systems and methods.

Mobile communication systems have evolved over the past ten years or so from the GSM System (Global System for Mobile communications) to the 3G system and now include packet data communications as well as circuit switched communications. The third generation partnership project (3GPP) is developing a fourth generation mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

Third and fourth generation mobile telecommunication systems, such as those based on the 3GPP defined UMTS and Long Term Evolution (LTE) architectures, are able to support a more sophisticated range of services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, some of which are in some respects typified by semi-autonomous or autonomous wireless communication devices (MTC devices) communicating small amounts of data on a relatively infrequent basis. Examples include so-called smart meters which, for example, are located in a customer's home and periodically transmit data back to a central MTC server relating to the customer's consumption of a utility such as gas, water, electricity and so on. Smart metering is merely one example of potential MTC device applications. Further information on characteristics of MTC-type devices can be found, for example, in the corresponding standards, such as ETSI TS 122 368 V11.6.0 (2012-09)/ 3GPP TS 22.368 version 11.6.0 Release 11) [1].

Whilst it can be convenient for a terminal such as an MTC-type terminal to take advantage of the wide coverage area provided by a third or fourth generation mobile telecommunication network there are at present disadvantages. Unlike a conventional third or fourth generation mobile terminal such as a smartphone, a primary driver for MTC-type terminals will be a desire for such terminals to be relatively simple and inexpensive. The type of functions typically performed by an MTC-type terminal (e.g. simple collection and reporting/reception of relatively small amounts of data) do not require particularly complex processing to perform, for example, compared to a smartphone supporting video streaming. However, third and fourth generation mobile telecommunication networks typically employ advanced data modulation techniques and support wide bandwidth usage on the radio interface which can require more complex and expensive radio transceivers and decoders to implement. It is usually justified to include such complex elements in a smartphone as a smartphone will typically require a powerful processor to perform typical smartphone type functions. However, as indicated above, there is now a desire to use relatively inexpensive and less complex devices which are nonetheless able to communicate using LTE-type networks.

With this in mind there has been proposed a concept of so-called "virtual carriers" operating within the bandwidth of a "host carrier", for example, as described in GB 2 487 906 [2], GB 2 487 908 [3], GB 2 487 780 [4], GB 2 488 513 [5], GB 2 487 757 [6], GB 2 487 909 [7], GB 2 487 907 [8] and GB 2 487 782 [9]. One principle underlying the concept of a virtual carrier is that a frequency subregion (subset of frequency resources) within a wider bandwidth (greater range of frequency resources) host carrier is configured for use as a self-contained carrier for at least some types of communications with certain types of terminal device.

In some implementations, such as described in references [2] to [9], all downlink control signalling and user-plane data for terminal devices using the virtual carrier are conveyed within the subset of frequency resources associated with the virtual carrier. A terminal device operating on the virtual carrier is made aware of the restricted frequency resources and need only receive and decode a corresponding subset of transmission resources to receive data from the base station. An advantage of this approach is to provide a carrier for use by low-capability terminal devices capable of operating over only relatively narrow bandwidths. This allows devices to communicate on LTE-type networks, without requiring the devices to support full bandwidth operation. By reducing the bandwidth of the signal that needs to be decoded, the front end processing requirements (e.g., FFT, channel estimation, subframe buffering etc.) of a device configured to operate on a virtual carrier are reduced since the complexity of these functions is generally related to the bandwidth of the signal received.

Other virtual carrier approaches for reducing the required complexity of devices configured to communicate over LTE-type networks are proposed in GB 2 497 743 [10] and GB 2 497 742 [11]. These documents propose schemes for communicating data between a base station and a reduced-capability terminal device whereby physical-layer control information for the reduced-capability terminal device is transmitted from the base station using subcarriers selected from across a full host carrier frequency band (as for conventional LTE terminal devices). However, higher-layer data for reduced-capability terminal devices (e.g. user-plane data) is transmitted using only subcarriers selected from within a restricted subset of carriers which is smaller than and within the set of subcarriers comprising the system frequency band. Thus, this is an approach in which user-plane data for a particular terminal device may be restricted to a subset of frequency resources (i.e. a virtual carrier supported within the transmission resources of a host carrier), whereas control signalling is communicated using the full bandwidth of the host carrier. The terminal device is made aware of the restricted frequency resource, and as such need only buffer and process data within this frequency resource during periods when higher-layer data is being transmitted. The terminal device buffers and processes the full system frequency band during periods when physical-layer control information is being transmitted. Thus, the reduced-capability terminal device may be incorporated in a network in which physical-layer control information is transmitted over a wide frequency range, but only needs to have sufficient memory and processing capacity to process a smaller range of frequency resources for the higher-layer data. This approach may sometimes be referred to as a "T-shaped" allocation because the area of the downlink time-frequency resource grid to be used by the reduced-capability terminal device may in some cases comprise a generally T-shape.

Virtual carrier concepts thus allow terminal devices having reduced capabilities, for example in terms of their transceiver bandwidth and/or processing power, to be supported within LTE-type networks. As noted above, this can be useful for to allow relatively inexpensive and low complexity devices to communicate using LTE-type networks. However, providing support for reduced capability devices in a wireless telecommunications system which is generally based around existing standards can require additional considerations for some operational aspects of wireless telecommunications systems to allow the reduced-capability terminal devices to operate in conjunction with conventional terminal devices.

One area where the inventors have recognised a need for new procedures concerns the acquisition of system information. In broad summary, system information, or at least some aspects of system information, in existing wireless telecommunications systems, such as LTE-based telecommunications systems, is transmitted for all terminal devices in a broadcast manner. This system information is transmitted in blocks of data called Master Information Blocks (MIBs) and System Information Blocks (SIBs). In the context of coverage enhancement, it is sometimes difficult for a terminal device (whether reduced capability or not) to receive large MIBs and SIBs. There is therefore a need for schemes which allows system information to be communicated to terminal devices operating in a coverage enhancement situation.

SUMMARY

A method of operating a terminal device in a wireless telecommunications network, comprising; receiving a system information block containing a list of a plurality of different values of a parameter used in the wireless telecommunication network; determining one or more parameter values in the list which is supported within the terminal device; and receiving a system information block associated with the one or more supported parameter values from one or more other system information blocks associated with non-supported parameter values.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
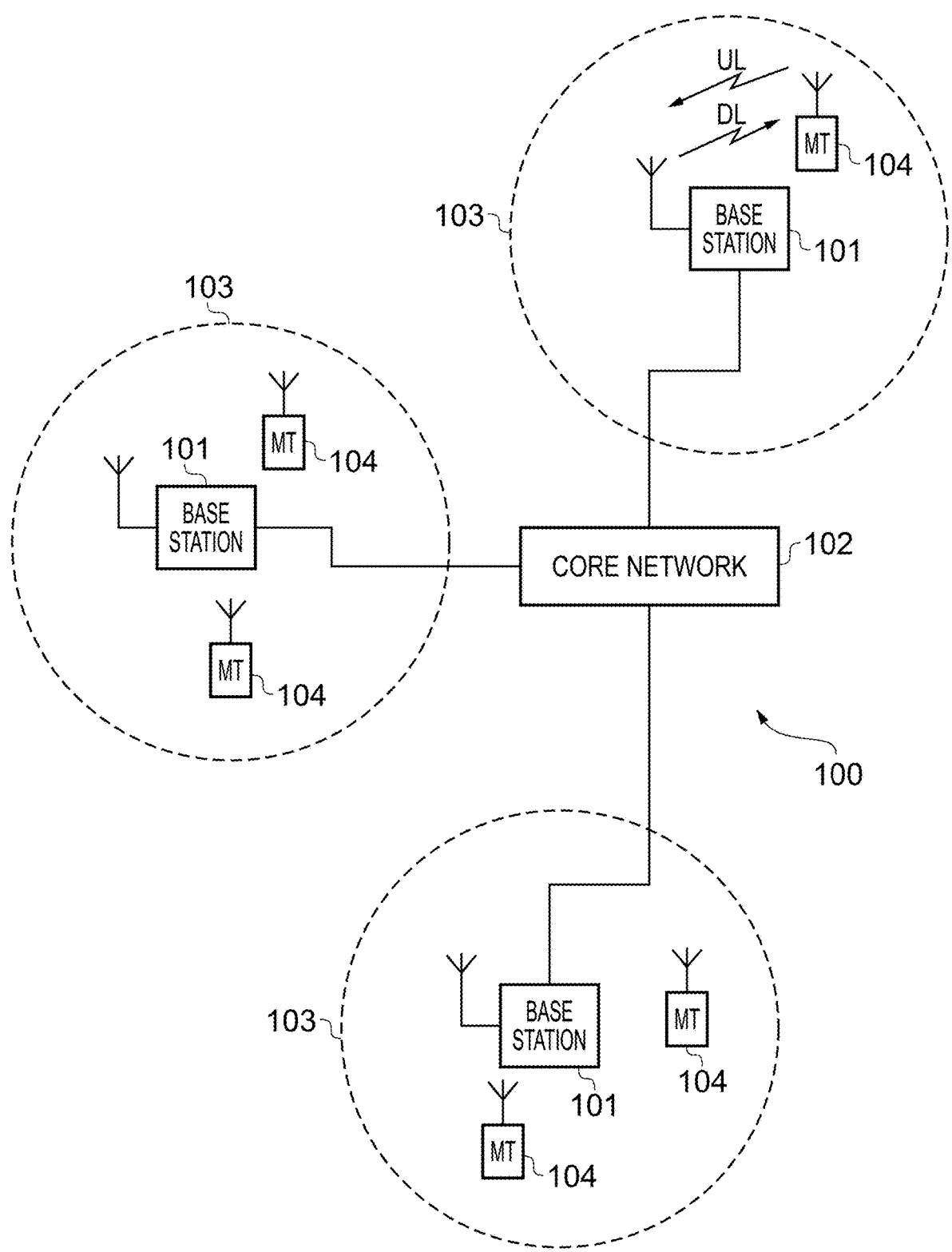
FIG. 1 schematically represents an example of a LTE-type wireless telecommunication network.

FIG. 1 provides a schematic diagram illustrating some basic functionality of a wireless telecommunications network/system 100 operating in accordance with LTE principles. Various elements of FIG. 1 and their respective modes of operation are well-known and defined in the relevant standards administered by the 3GPP (RTM) body and also described in many books on the subject, for example, Holma, H. and Toskala, A. [12].

The network 100 includes a plurality of base stations 101 connected to a core network 102. Each base station provides a coverage area 103 (i.e. a cell) within which data can be communicated to and from terminal devices 104. Data are transmitted from base stations 101 to terminal devices 104 within their respective coverage areas 103 via a radio downlink. Data are transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-NodeBs, and so forth.

Figure 2:
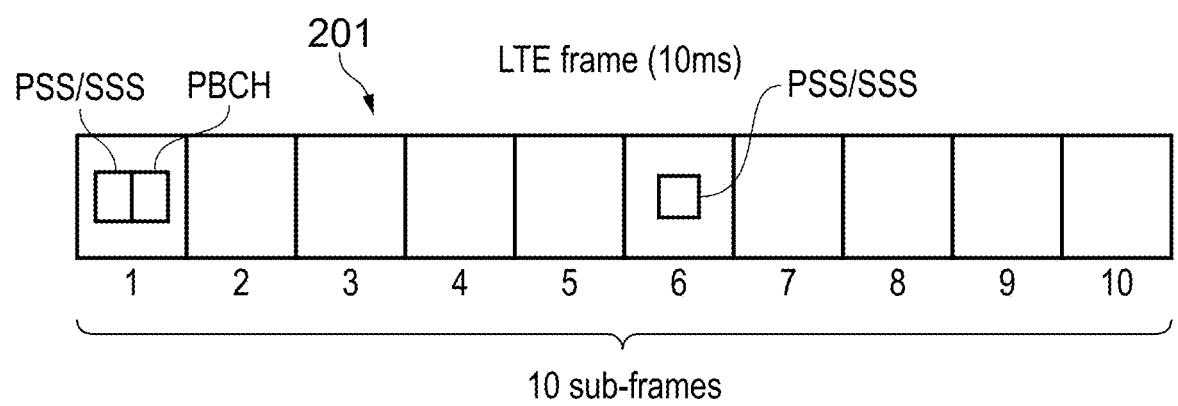
FIG. 2 schematically represents some aspects of a LTE downlink radio frame structure.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and a single carrier frequency division multiplex based interface for the radio uplink (so-called SC-FDMA). FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
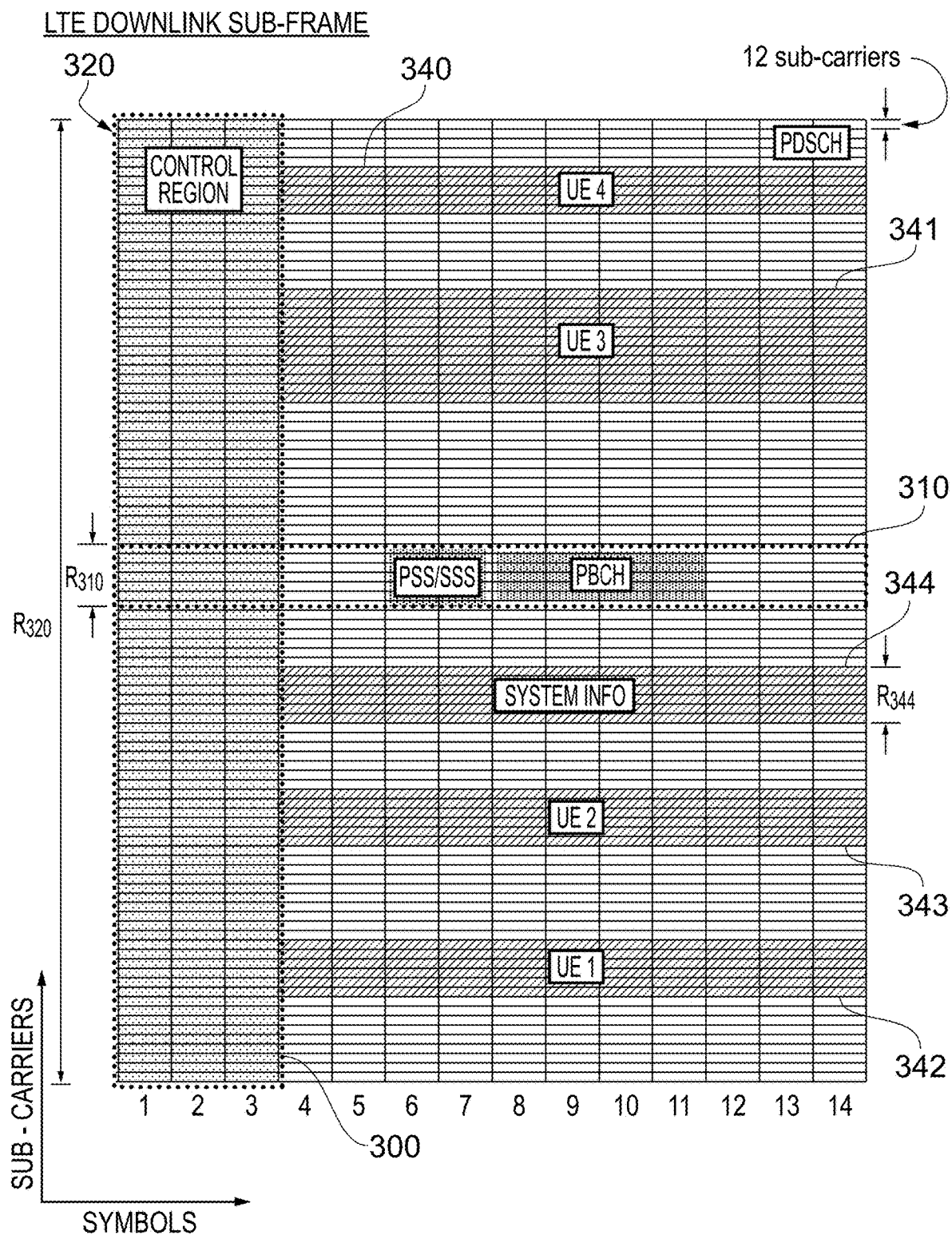
FIG. 3 schematically represents some aspects of a LTE downlink radio subframe structure.

FIG. 3 is a schematic diagram of a grid which illustrates the structure of an example conventional downlink LTE subframe (corresponding in this example to the first, i.e. left-most, subframe in the frame of FIG. 2). The subframe comprises a predetermined number of symbols which are transmitted over a 1 ms period. Each symbol comprises a predetermined number of orthogonal sub-carriers distributed across the bandwidth of the downlink radio carrier.

The example subframe shown in FIG. 3 comprises 14 symbols and 1200 sub-carriers spread across a 20 MHz bandwidth. The smallest allocation of user data for transmission in LTE is a resource block comprising twelve sub-carriers transmitted over one slot (0.5 subframe). For clarity, in FIG. 3, each individual resource element (a resource element comprises a single symbol on a single subcarrier) is not shown, instead each individual box in the subframe grid corresponds to twelve sub-carriers transmitted on one symbol.

FIG. 3 shows resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data are transmitted in a control region 300 (indicated by dotted-shading in FIG. 3) of the subframe comprising the first n symbols of the subframe where n can vary between one and three symbols for channel bandwidths of 3 MHz or greater and where n can vary between two and four symbols for channel bandwidths of 1.4 MHz. For the sake of providing a concrete example, the following description relates to carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the subframe have been allocated to specific LTE terminals. Thus, the PDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the subframe.

FIG. 3 also shows a region of PDSCH containing system information and extending over a bandwidth of R344.

A conventional LTE frame will also include reference signals which are not shown in FIG. 3 in the interests of clarity.

Figure 4:
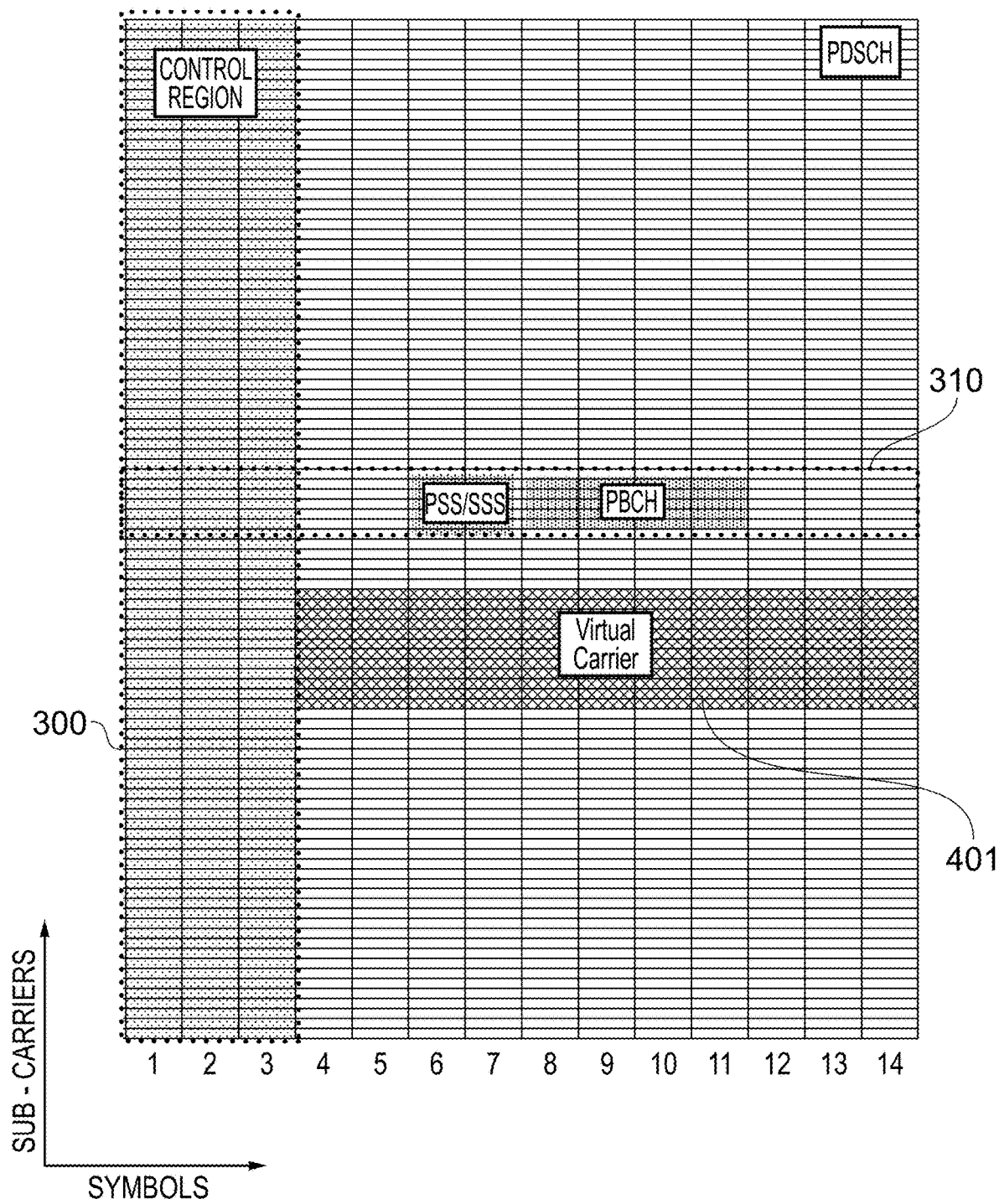
FIG. 4 schematically represents some aspects of a LTE downlink radio subframe structure associated with a host carrier supporting a virtual carrier.

FIG. 4 is a diagram which is similar to and will in many respect be understood from FIG. 3. However, FIG. 4 differs from FIG. 3 in schematically representing a downlink radio subframe corresponding to a host carrier in which a virtual carrier 401 (VC) is supported. The general operation of the virtual carrier represented in FIG. 4 may be in accordance with previously-proposed schemes, for example as described in any of the above-identified documents [2] to [11]. The virtual carrier thus represents a restricted subset of downlink transmission resources within the overall transmission resource grid associated with the host carrier which may be used for communicating at least some information with certain types of terminal devices, for example, reduced capability machine type communication terminal devices.

Thus, a conventional (i.e. non-reduced capability) terminal device may be supported using the full bandwidth of the resource grid represented in FIG. 4 in accordance with conventional LTE techniques. Downlink communications for a reduced-capability terminal device, on the other hand, may be restricted to a subset of transmission resources within the virtual carrier.

In some cases the entirety of the downlink communications for the reduced-capability terminal device (i.e. including control signalling and higher layer/user-plane data) may be conveyed within the transmission resources of one of the virtual carriers, for example in accordance with the principles proposed in the above-identified documents [2] to [9]. This may be appropriate, for example, for a terminal device which cannot receive the full bandwidth of the host carrier (and hence cannot receive the entirety of the control region 300).

In other cases the reduced-capability terminal device may be able to receive the full-bandwidth of the host carrier (and hence receive and decode the control region 300), but may be restricted as to its ability to buffer and decodes the entirety of the PDSCH region, and so may buffer and decode only a subset of the downlink transmission resources spanning the virtual carrier to which the terminal device has been allocated, for example in accordance with the "T-shaped allocation" principles proposed in the above-identified documents [10] and [11]. While this mode of operation may be referred to as a "T-shaped allocation" mode of operation for ease of reference, the PDSCH resources allocated to the reduced-capability terminal device need not be contiguous in frequency. That is to say that while the virtual carrier resources schematically represented in FIG. 4 are shown as a continuous block, in some examples the restricted subset of resources may be a subset of OFDM carriers distributed (spread) across the system bandwidth. Furthermore, it will be appreciated the subset of OFDM subcarriers comprising a virtual carrier for one particular terminal device may be different from a subset of OFDM subcarriers associated with supporting virtual carrier operation for another terminal device.

As noted above, virtual carrier operation can have an impact on how system information changes can be received by a reduced-capability terminal device.

In an LTE-based wireless telecommunications system some of the fundamental information required for a terminal device to operate in a cell is transmitted on PBCH in the Master Information Block (MIB). Other information regarding the system configuration is divided among System Information Blocks (SIBs) referred to as SIB1, SIB2, SIB3, . . . etc. (there are 16 SIBs defined as of Release 11 LTE). The SIBs are transmitted in system information (SI) messages, which, apart from SIB1, may contain multiple SIBs. There may be one or several SI messages transmitted at different periodicities. Each SI message may convey multiple SIBs suitable for scheduling with the same periodicity. The timings for SIB1 transmissions are fixed on an 80 ms period and they occur in the fifth subframe of radio frames when System Frame Number (SFN) is a multiple of 8 (i.e. SFN mod 8=0). There are retransmissions of SIB1 provided in every other radio frame within the 80 ms period. The timings for other SIB transmissions are configured in SIB1. The transmission resource allocations for the SI messages on PDSCH within a subframe are provided to terminal devices using PDCCH allocation messages addressed to SI-RNTI (System Information Radio Network Temporary Identifier—currently 0xFFFF in LTE). At higher layers, SI is carried on the logical broadcast control channel (BCCH).

The system information in a cell may be changed, although typically this happens rarely with system information perhaps remaining unchanged for hours, days, or even weeks.

For changes of system information other than those related to EAB (Extended Access Barring), ETWS (Earthquake Tsunami Warning System) and CMAS (Commercial Mobile Alert System), there is a BCCH modification period defined (which may be referred to as a "SI modification period"). SI modification period boundaries are defined on radio frames for which SFN mod q=0, for a cell-specific value of q. When there is a change in system information, the new system information is transmitted from the start of a new SI modification period.

The general process for implementing scheduling in system information in an LTE-based network is described, for example, in Section 5.2.1.2 of ETSI TS 136 331 V11.4.0 (2013-07)/3GPP TS 36.331 version 11.4.0 Release 11 [13]. In summary, a base station indicates a change of system information as follows.

More details on system information and scheduling in system information in an LTE-based system can be found in ETSI TS 136 331 V11.4.0 (2013-07)/3GPP TS 36.331 version 11.4.0 Release 11 [13].

As discussed above, it has been proposed to reduce the complexity of an LTE modem by reducing the baseband bandwidth over which certain types of terminal device operate. In particular, it may be desirable to reduce at least the baseband bandwidth over which the terminal device is to receive PDSCH (i.e. using T-shaped allocation virtual carrier techniques). This can have the advantages of lowering the complexity of subframe buffering, post-FFT buffering, channel estimation, and turbo decoding; and lower complexity creates an opportunity for lower modem cost and also reduced operational power consumption. Low complexity modems are particularly attractive for use in machine-type communication (MTC) terminal devices.

Such a reduced-capability terminal device might, for example, be adapted to receive PDCCH across a full system bandwidth spanning n physical resource blocks (PRBs), e.g. n=50 PRBs for a system bandwidth of 10 MHz at baseband. However, the terminal device might be adapted to receive PDSCH in a maximum of m PRBs, where m is less than n. For example m=6, corresponding to an effective bandwidth of 1.4 MHz at baseband for PDSCH.

The buffering requirements can be reduced if the UE is given an indication of which m PDSCH PRBs it must buffer before it needs to decode them, so that a buffer suitable for 6 instead of 50 PRBs can be provided. Since the RF bandwidth is not changed, these 6 PDSCH PRBs could be anywhere within the system bandwidth and, in general, might be contiguous or non-contiguous in frequency per subframe. In the subframe in which PDSCH decoding occurs, PDCCH can schedule any subset or the whole of the 6 PRBs since all 6 have been buffered by the UE. Some example techniques for establishing the predetermined subset of PDSCH resources to buffer at the terminal device can be found in GB 2 497 743 [10] and GB 2 497 742 [11], but in general any suitable technique can be used.

The restricted subset of transmission resources on which a reduced-capability terminal device can receive PDSCH in a given subframe impacts how system information messages should be handled in the wireless telecommunications system. A PDCCH resource allocation to SI-RNTI to indicate a change in system information is transmitted in the PDCCH common search space, and therefore all terminal devices receive the relevant SIBs using the same PDSCH resources (at least for system information which is relevant for all terminal devices). To be receivable by a reduced-capability terminal device, the SIBs should be scheduled on physical resource blocks which the reduced-capability terminal device will buffer in the relevant subframe. Furthermore, this will be a restricted number of PRBs, e.g. requiring SIBs to be transmitted within m (e.g. m=6) PRBs.

However, the base station also needs send user data to reduced capability (low complexity) terminal devices using the restricted subset of PDSCH resources for the terminal device. To help increase the number of reduced-capability terminal devices that can be supported in a network and overall scheduling flexibility, it can be helpful if different reduced-capability terminal devices can operate using different restricted subsets of transmission resources. This means the PDSCH resource blocks which different terminal devices are buffering to receive their own user data will not in general be the same resource blocks in which system information (SIBs) is sent. The previously proposed schemes for virtual carrier operation have addressed how a terminal device can acquire system information when attaching to a network, notwithstanding the terminal device's ability to decode only a restricted subset of PDSCH resources in a given subframe. However, different techniques may be needed when a reduced-capability terminal device is to acquire new system information, for example because of a change in system information, while it is connected to the network (e.g. in RRC connected mode).

Figure 5:
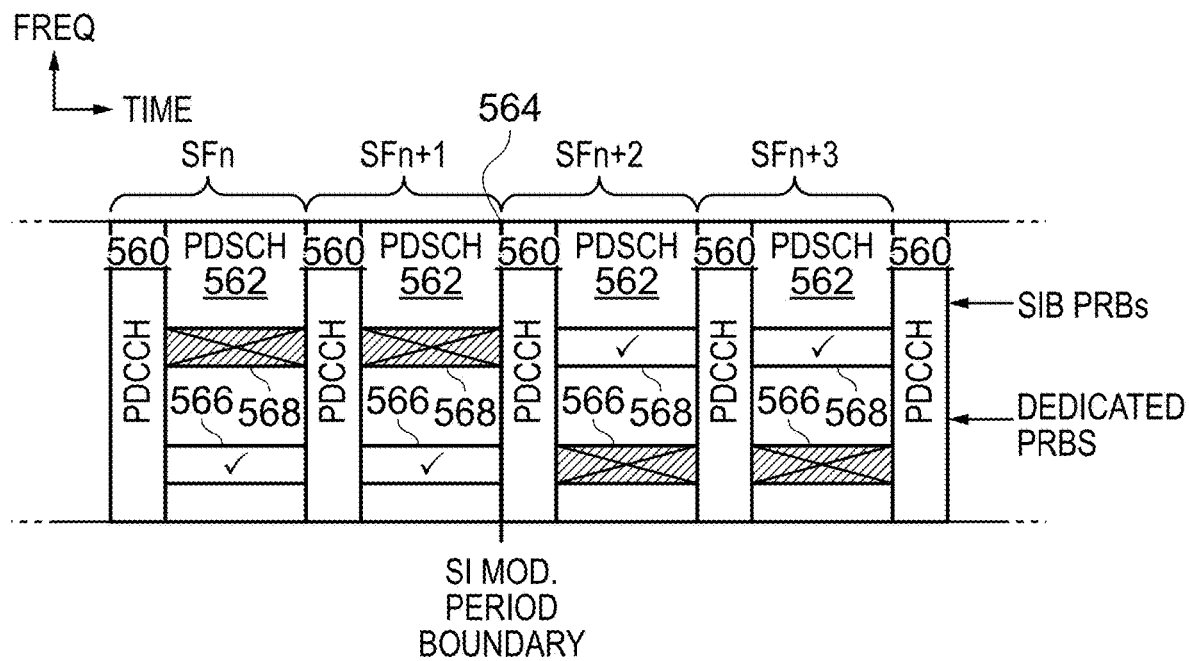
FIG. 5 schematically represents some aspects of a series of radio subframes spanning a system information modification period boundary for a host carrier supporting a virtual carrier.

FIG. 5 schematically represents a downlink frequency resource grid spanning four subframes labelled as SFn, SFn+1, SFn+2 and SFn+3 for an LTE-based wireless telecommunications system supporting a virtual carrier mode of operation in which a reduced-capability terminal device is restricted to buffering a subset of PDSCH resources while being able to receive the full bandwidth of PDCCH resources. As described above, each subframe comprises a PDCCH region 560 and a PDSCH region 562. Subframes SFn+1 and SFn+2 are assumed to span a system information modification period boundary 564, as schematically represented in the figure. Schematically represented in the PDSCH region of each subframe is an indication of the subset of transmission resources 566 which an example reduced-capability terminal device would use if it were receiving a user-plane data. These may be referred to as dedicated physical resource blocks for the reduced-capability terminal device. Also schematically represented in the PDSCH region of each subframe is an indication of the transmission resources 568 the base station would use if it were transmitting system information blocks in the relevant subframe. These may be referred to as SIB physical resource blocks. It will be appreciated the respective sets of transmission resources 566, 568 are shown as contiguous blocks occurring at the same place in each subframe purely for ease of representation. In practice the resources 566 comprising the dedicated PRBs for the reduced-capability terminal device may not be contiguous and their position and frequency may change in different subframes. Likewise for the resources 566 comprising the SIB PRBs (i.e. they may in general be scheduled on different frequency resources in each subframe).

In subframes SFn and SFn+1 the reduced-capability terminal device is assumed to be operating in a known "T-shaped" virtual carrier mode of operation in which it buffers the full PDCCH region 560 and the restricted subset of PDSCH transmission resources 566 established for dedicated user-plane data transmissions for the reduced-capability terminal device. While the device is buffering the dedicated PRBs 566 it is unable to buffer the transmission resources 568 used by the network for transmitting system information. This is schematically represented in FIG. 5 by a tick mark in the PDSCH transmission resources 566 comprising the dedicated PRBs and a cross mark and shading in the PDSCH resources 568 comprising the SIB PRBs.

In the schematic example represented in FIG. 5 it is assumed the base station is to make a change to system information at the system information modification period boundary 564 between subframes SFn+1 and SFn+2. The reason for the system information change in any given implementation is not significant to the operation of embodiments of the disclosure.

A reduced-capability terminal device can receive a system information change notification from a base station in the same way as for a conventional terminal device in the conventional manner discussed above. Established techniques can also be used to inform the terminal device of the transmission resources used for transmitting system information (i.e. the resources 568 identified in FIG. 5 as SIB PRBs).

However, an issue arises in that the reduced-capability terminal device may not be able to receive some of the larger SIBs. Further, in order to extend the coverage of these reduced capability devices, repetition of data in the SIB may be performed.

The inventors have identified various mechanisms to receive some of the larger SIBs in reduced capability terminal devices. One approach is to send a version of the SIB for non reduced-capability terminal devices and a copy of the SIB specifically for terminal devices operating at 1.4 MHz bandwidth and/or with coverage enhancement. This may involve removing non-essential information and cutting larger blocks down. However, even with this approach, the inventors have identified several issues.

Firstly, there is not a large amount of information that can be considered as not essential. This is particularly true if the low complexity devices need to support inter-frequency mobility. This feature is important in the field of wearable technology (such as smartwatches) as the largest sized SIBs are mobility related. Secondly, it is considered by the inventors to be inefficient to broadcast the same information twice.

Figure 6:
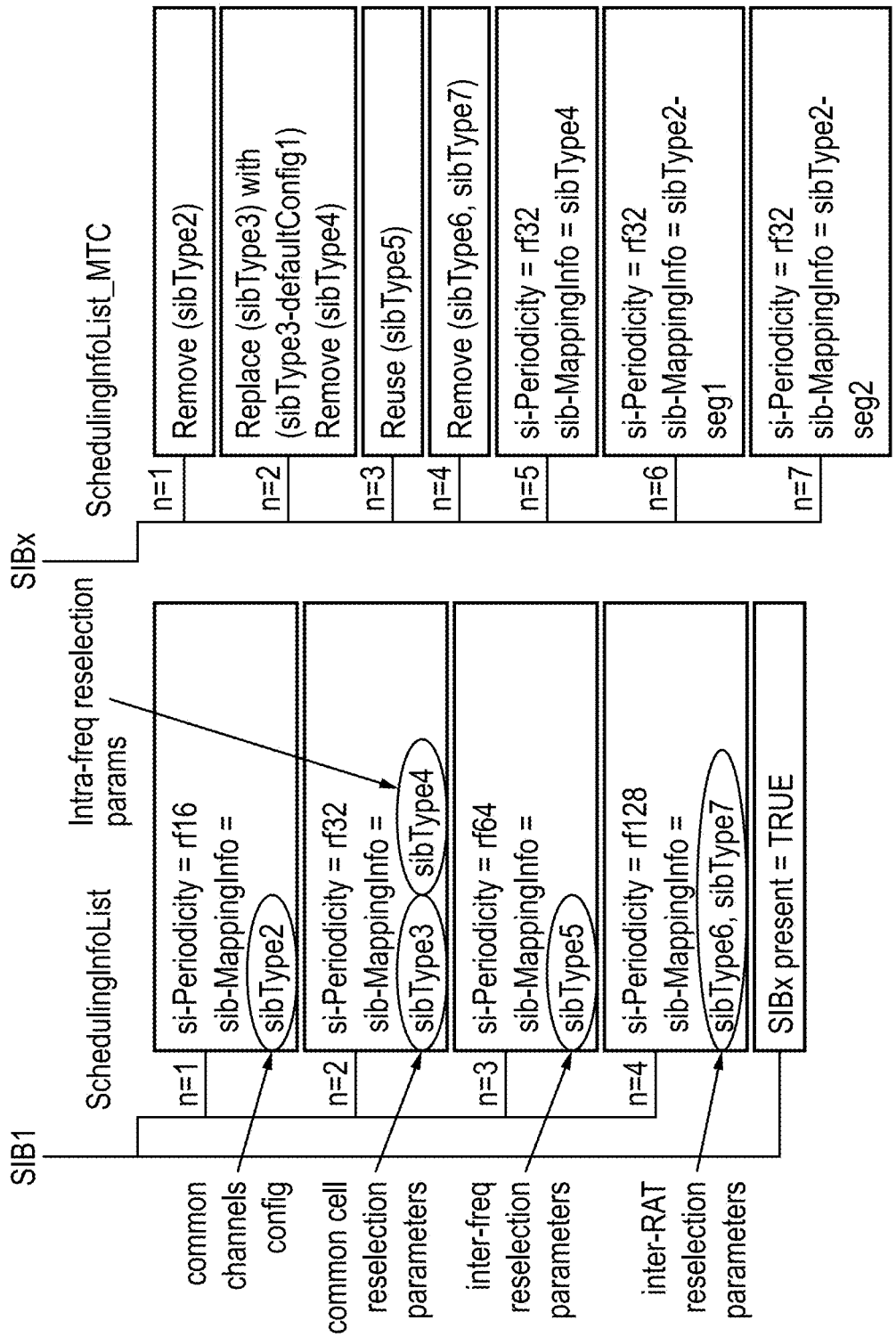
FIG. 6 schematically represents a block of system information containing scheduling information along with a first block of system information containing scheduling information according to an example of the present disclosure.

According to the present disclosure, the scheduling information for a block of system information, such as a SIB, is provided by SchedulingInfoList. This is transmitted to the terminal devices in so-called "SIB1". A diagram showing the structure of SIB1 according to the present disclosure is shown in FIG. 6. As with a known SIB1, the SIB1 according to present disclosure is transmitted to the terminal devices at a fixed time location. In examples, the SystemInformationBlockType1 uses a fixed schedule with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0. Of course, any appropriate time location may be used The SchedulingInfoList of the SIB1 structure according to the present disclosure contains the scheduling information for the other SIBs. For example, SIB2 is used to send common channel (e.g. PCCH and PRACH) configuration. SIB3 is used to send cell reselection configuration information. This is common to inter/intra-freq and inter-RAT (for example serving cell thresholds and suitability criteria). SIB4 contains information specific to intra-frequency reselection. SIB5 contains information specific to inter-frequency reselection. SIB6 and SIB7 contains UTRAN and GERAN cell reselection information, respectively. This is similar to the known SIB structure. The order of the SIB1 structure is defined in the 3GPP TS 36.331 section 6.2.2 (System/nformationBlockType1 Message) Standard.

The SIB1 structure according to embodiments of the present disclosure, however, also includes a flag which indicates whether additional scheduling information in the form of a SIB designed for reduced capability terminal devices is included in SIB1. This flag, or a different flag, may also indicate whether additional scheduling information in the form of a SIB designed for coverage enhancement is included in SIB1. In FIG. 6, this additional SIB is identified as "SIBx" and the flag is "SIBx present=true". Of course, SIBx may relate to the SIB for reduced capability terminal devices and/or coverage enhancement terminal devices. As would be appreciated, although an explicit flag is shown in FIG. 6, in other examples, any marker (a flag or otherwise)

indicating that an additional SIB is included may be located in the scheduling information with SIB1, for example, at n=5 in the numbering of FIG. 6 or may be separately included in an existing or newly defined master information block (MIB) to indicate the presence of the additional scheduling block. The marker and the newly defined scheduling may alternatively also be contained in a newly defined MIB which is separate to the existing MIB. In other words, the marker indicating the presence of SIBx is sent in the master information block (MIB) rather than SIB1. The terminal device then does not receive (or otherwise ignores) the scheduling information from SIB1 and instead reads only the scheduling information from SIBx.

Of course, and will be explained later, although only a single additional SIB is identified by the flag, other embodiments may include more than one additional SIB specific for reduced capability terminal devices. For example, one additional SIB may be provided for reduced bandwidth terminal devices and a second additional SIB for coverage enhancement terminal devices. Other embodiments may include an extension to SIB1 containing the additional scheduling information instead of, or in addition to, an additional one or more SIBs.

So, when a terminal device receives the SIB1 structure according to embodiments of the present disclosure, the terminal device checks for the presence of the additional SIBx identified by the flag or otherwise. If the terminal device is a reduced capability terminal device, or operating in coverage enhancement mode, the terminal device will retrieve the SIBx appropriate for the type of reduced capability terminal device or the current coverage mode. However, if the terminal device is not a reduced capability terminal device, or operating in coverage enhancement mode, the terminal device will ignore the additional SIB and continue to process the SIB as already known. This means that the SIB1 according to embodiments of the present disclosure is compatible with both non capability reduced terminal devices, devices operating in coverage enhancement mode, and legacy devices.

If the terminal device is a capability-reduced terminal device or is operating in coverage enhancement mode and has identified the appropriate additional SIBx, the terminal device obtains the SchedulingInfoList from SIBx. For the sake of clarity, the SchedulingInfoList of the additional SIBx is termed "SchedulingInfoList_MTC", although any title may be appropriate.

As will be noted, SchedulingInfoList_MTC contains entries n=1 to n=4 which map to entries n=1 to n=4 of SIB1. So, the order of the scheduling information for SIB1 is the same as the order of the scheduling for SIBx where this mapping occurs. SchedulingInfoList_MTC also contains entries n=5 to n=7 which do not map to entries within SIB1. The purpose of SIBx is to provide instructions on whether and how the various entries of SIB1 (for example in FIG. 6, n=1 to n=4) should be altered by the capability reduced terminal device. The content and function of each of these entries within SIBx will now be explained with reference to the SIBx structure located on the right hand side of FIG. 6.

Entry n=1 of SIBx contains the term "Remove(sibType2)". This means that the reduced capability terminal device is instructed to remove SIB2 from the entry n=1 within SIB1 and hence no system information block will be received at n=1. Entry n=2 of SIBx contains the term "Replace (sibType3) with (sibType3-defaultConfig1) Remove (sibType4)". This means that the reduced capability terminal device will replace the sibType3 in entry n=2 of SIB1 and replace this with a default configuration stored within the reduced capability device. This default configuration may be pre-stored in the reduced capability device or may be transferred to the reduced capability device using some mechanism. Further, the reduced capability terminal device will remove (by not receiving) SIB4 from the entry n=2 within SIB1.

Entry n=3 of SIBx contains the term "Reuse(sibType5)". This means that the reduced capability terminal device is instructed to use the content of SIB5. This may be done using an explicit indication, or for example by omitting (leaving empty) the entry n=3 in the SchedulingInfoList_MTC. Entry n=4 of SIBx contains the term "Remove (sibType6, sibType7)". This means that the reduced capability terminal device will remove (i.e. not receive) SIB6 and SIB7 from entry n=4 within SIB1 and not attempt to receive those.

Entry n=5 to n=7 of SIBx do not map to SIB1. Within entry n=5 to n=7, scheduling for the replacement SIBs that have been removed from entry n=1 to n=4 or for any new (additional) SIBs is included. Specifically, in the example of FIG. 6, entry n=5 of SIBx states that SIB4 will be sent with a periodicity of 32 radio frames. In other words, compared with entry n=2 of SIB1, SIB4 in SIBx is sent on its own without being combined with SIB3. By sending a replacement for any of the mobility related system information (e.g. SIB4, SIB5) it is possible to reduce the number of signalled neighbours compared to the SIB scheduled for other devices resulting in a smaller size of system information block.

Entry n=6 and n=7 of SIBx states that SIB2 be effectively split into two parts, segment 1 and segment 2 (seg1 and seg2 of FIG. 6). Each of these segments will have a periodicity of 32 radio frames.

This splitting of a SIB (in this case SIB2) is particularly useful in instances where a device is located in a weak signal area, such as on the edge of a cell or in a basement (i.e. operating in a so called coverage enhancement mode). Typically, these devices require a SIB to be sent many times in order to receive a complete SIB. By splitting the SIB into segments means that once a segment is received, it does not need to be re-sent. This saves network resources and battery life within the terminal device.

The use of this additional SIB, SIBx, allows a reduced capability terminal device to only use and retrieve SIBs that are relevant to it. This saves battery life within the terminal device. Similarly, in some instances, it is not possible for the reduced capability terminal device to receive the SIB. In this case, the SIB may be split into many segments and retrieved, or may be simply replaced with a default configuration.

Figure 7:
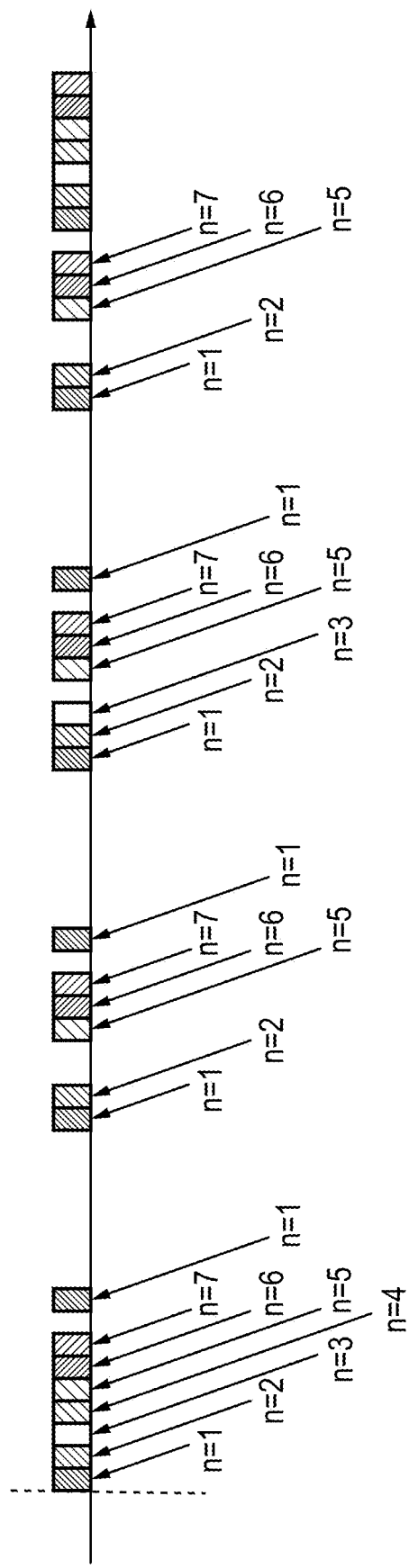
FIG. 7 shows a timing diagram for the blocks of system information according to FIG. 6.

FIG. 7 shows the relative scheduling of each of the SIBs set out in SIB1 and SIBx over time. This is given using the list position and the periodicity given in SIB1 and SIBx of FIG. 6. As would be appreciated, FIG. 7 is illustrative only; entry n=1 (SIB2) is repeated every 16 radio frames; entry n=2 (SIB3, SIB4) is repeated every 32 radio frames; entry n=3 (SIB5) is repeated every 64 radio frames; entry n=4 (SIB6, SIB7) is repeated every 128 radio frames; entry n=5 to n=7 is repeated every 32 radio frames.

An example will now be given with three different types of terminal device and how each may use the information provided in the SIBs to determine what information to decode. The first is a smartphone, the second is a smartwatch and the third is a power meter in a basement. Each of these terminal devices have different capabilities and requirements.

Let us assume that the smartphone supports LTE category 1, UMTS and GSM. Let us also assume the smartwatch is a narrowband LTE device (Rel-13 category) which does not support UMTS or GSM but has to support mobility with LTE. Let us finally assume that the smart meter is either a category 0 (Rel-12) or narrowband (Rel-13) device which also supports coverage enhancement to receive LTE data, including system information. The smart meter is a stationary device and so does not need to support mobility.

A legacy terminal device will only receive the SIBs at n=1, 2, 3, 4. This is because the legacy terminal device does not have a restriction on either RF bandwidth or coverage and so no segmented or reduced information is required.

Figure 8:
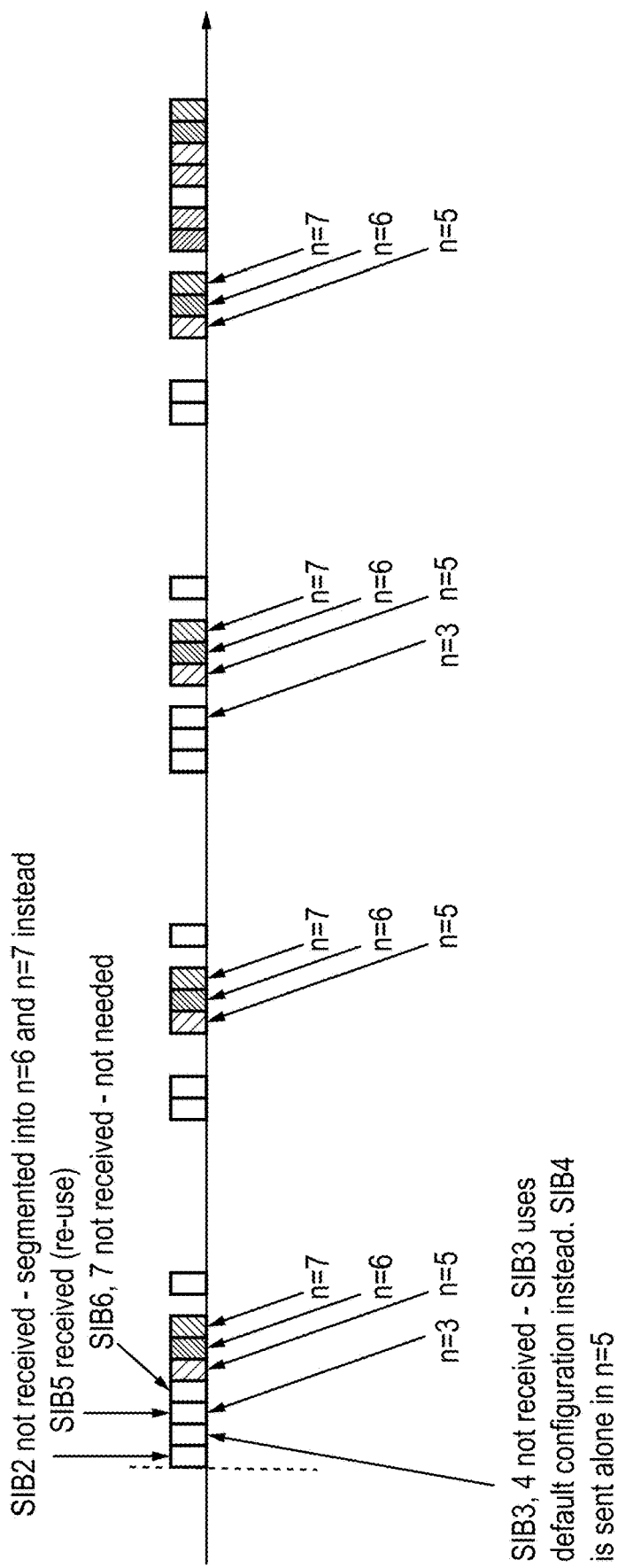
FIG. 8 shows a timing diagram for an example MTC device receiving the block of FIG. 6.

The smartwatch device has narrowband RF so must follow the information given in SIBx. The SIBs received at the smartwatch are shown in FIG. 8.

As the smartwatch is narrowband RF, it is likely that SIB2 (in n=1) will be too large and is spread over more than 6 physical resource blocks, and it is also likely that SIB2 will be too large to segment to support repetition for coverage enhancement, but will be segmented to be received by the smartwatch. Therefore, SIB2 in n=1 will not be received by either the smartwatch or the smart meter, but will instead be received in two segments and provided in n=6 and n=7. By providing these segments in n=6 and n=7, they will not be received by the smartphone or legacy devices. This is because these devices only recognise n=1 to n=4.

The inclusion of SIB3 and SIB4 in n=2 means that SIB3 and SIB4 are also too large to be received by either the smartwatch or the smart meter. SIB5 on the other hand is not too large for 6 physical resource blocks so can be received by the smartwatch. However, as SIB5 relates to interfrequency reselection parameters, which is a feature of mobility, this is not required by the smart meter and not required to be sent using repetition for coverage enhancement mode. Therefore, SIB5 only needs to be received by the smartwatch.

SIB6 and SIB7 in n=4 are also too large to be spread over 6 physical resource blocks and so cannot be received by either the smartwatch or the smart meter. In any event, as SIB6 and SIB7 relate to UTRAN and GERAN cell reselection respectively, neither the smartwatch nor the smart meter need this information as they only support LTE. Therefore, SIB6 and SIB7 will not be received by either the smartwatch or the smart meter (see n=4 in the SIBx where SIB6 and SIB7 are "removed").

Turning now specifically to FIG. 8 which shows the SIBs received by the smartwatch. As indicated by SIBx, at n=1, SIB2 is not received as it is segmented into two sections and is provided at n=6 and n=7 instead.

At n=2, the smartwatch does not receive SIB3 or SIB4. Instead, n=2 tells the smartwatch to replace the content of SIB3 with a default configuration which may be a predefined common channel configuration; this pre-defined common configuration may either be defined in the specifications, defined in the SIM function of the smartwatch, or may be pre-established using, for example, dedicated signalling or hard-coded at manufacture according to an operator-specific configuration. This may contain, for example, fixed reduced capability terminal device specific PRACH resources. Additionally, at n=2 within SIBx, SIB4 is read when it is sent alone in n=5. As SIB4 is not combined with SIB3, SIB4 can be sent using less than 6 physical resource blocks. It should be noted here that the contents of SIB4 (when sent in n=5) may be different to SIB4 sent at n=2. This is because the legacy device (such as the smartphone) will not receive n=5 and may require a larger inter-frequency list than that of the smartwatch. Therefore, by knowing that n=5 will only be received by the smartwatch, it is possible to tailor the SIB information for the smartwatch. This reduces network resource and extends battery life of the smartwatch.

It also provides a possibility to perform repetitions in order to support some level of coverage enhancement, which may be required by a reduced capability device in order to meet similar performance requirements as a device without reduced capability. This could be, for example, a coverage enhancement of 3 dB to compensate for the device having only 1 receive antenna.

At n=3, SIB5 from the SchedulingInfoList of SIB1 is reused. This is because it is required by the smartwatch and will also fit within 6 physical resource blocks.

It is possible to send SIB5 with additional repetitions. This supports the use of the smartwatch also requiring repetition. In this case, SIB5 would still be scheduled at the same position, but with some additional repetitions. As n=3 is received by legacy devices, the provision of repetitions of SIB5 means that there is possible further support for coverage enhancement of legacy devices.

Additionally, with regard to the smart meter, SIB5 is not required as mobility information is not used by the stationary smart meter. Therefore, the smart meter would only need to read the information contained in SIBx at n=5, 6 and 7. This has the advantage that, in order to support coverage extension, only the new SIBs need to be sent with additional repetitions, while the existing SIBs remain unaffected and require no repetitions.

Although the foregoing has indicated that SIBx may include instructions that relate to scheduling information of SIBs referenced in SIB1, the present disclosure is not so limited. Specifically, SIBx may include instructions that tell the terminal device to ignore all scheduling information located in SIB1. The scheduling information in SIBx may then instead provide scheduling information to the terminal device which relates to the delivery of newly defined SIB types (i.e. SIB types not located in SIB1). In other words, although it is possible that the scheduling information in SIBx relates to the scheduling of SIBs mentioned in SIB1, the present disclosure is not so limited and the scheduling information in SIBx may relate to the scheduling of SIBs not mentioned in SIB1.

Coverage Enhancement

As noted above, SIBx may provide scheduling information for a terminal device (either reduced capability or not) operating in coverage enhancement mode. In order to operate in coverage enhancement mode, the SIB will need transmitting with a certain number of repetitions depending on the amount of coverage enhancement required by the terminal device. For example, a smart watch which may require 3 dB of coverage enhancement will need a SIB repeated less times than a smart meter that may require 15 dB of coverage enhancement.

Given this, it is envisaged that a cell may provide more than one level of coverage enhancement. Specifically, a cell may support normal coverage (i.e. no coverage enhancement and no repetitions of the SIB); 3 dB coverage enhancement which requires some repetitions of the SIB; and 15 dB coverage enhancement which requires more repetitions than the 3 dB coverage enhancement as would be appreciated.

However, the inventors have identified at least one problem with this. In order to support both 3 dB and 15 dB coverage enhancement, the SIBs used by the smartwatch (for 3 dB coverage enhancement) and the SIBs used by the smart meter (for 15 dB coverage enhancement) are separate and sent with different numbers of repetitions. The smart watch would therefore read the 3 dB coverage enhancement SIB and potentially also the 15 dB coverage enhancement SIBs and the smart meter would read only the 15 dB coverage enhancement SIB. In other words, the smart watch can read both the 3 dB coverage enhancement SIBs and the 15 dB coverage enhancements SIBs whereas the smart meter would read only the 15 dB coverage enhancement SIB. So, the terminal device will read the SIBs based on the capability of the terminal device.

Figure 9:
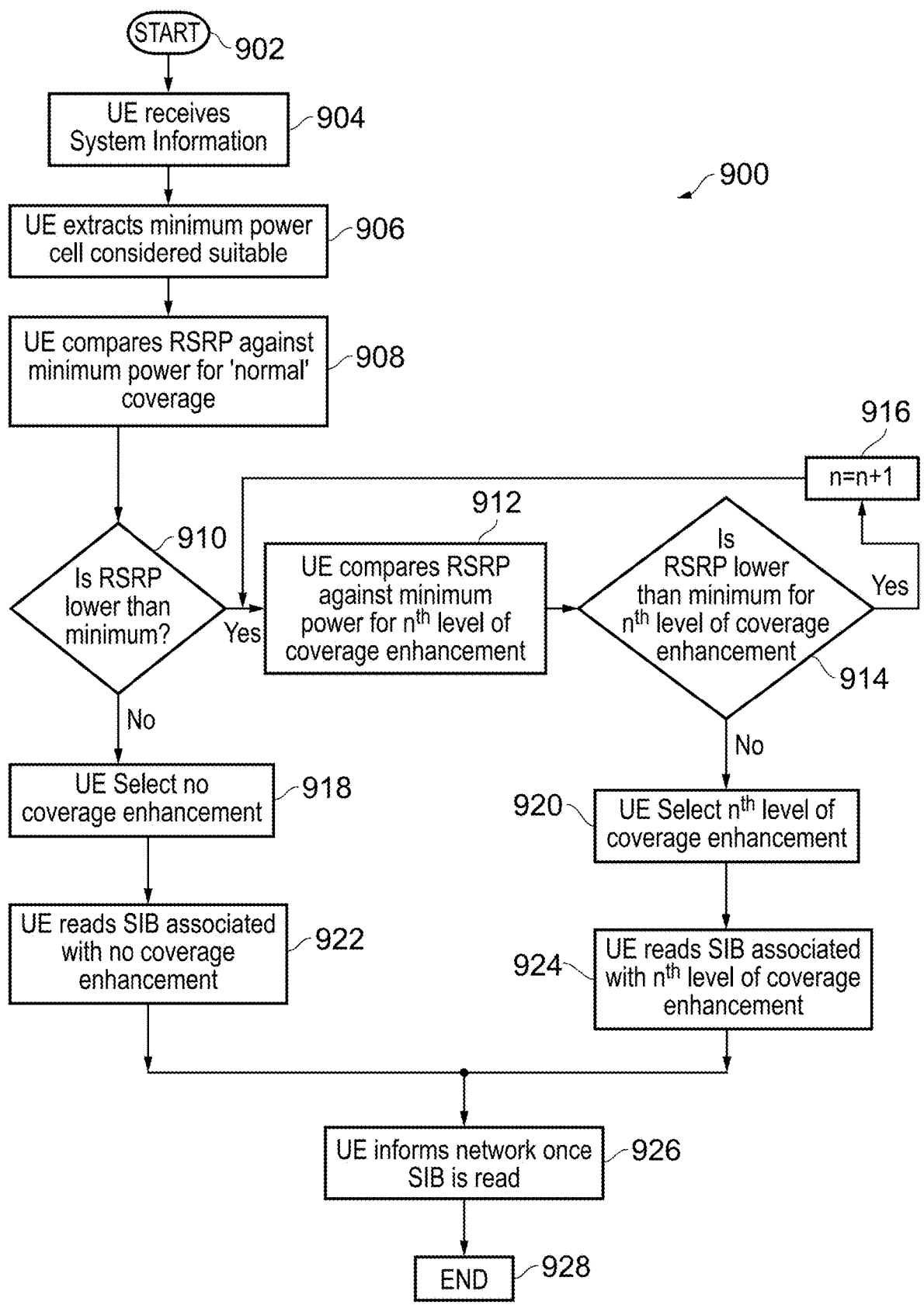
FIG. 9 shows a flow diagram explaining the process according to the present disclosure.

However, the inventors recognise that reading SIBs with a high number of repetitions (or any number of repetitions) consumes more energy than reading a SIB only once. Additionally, some SIBs may only be able to be read in 3 dB coverage enhancement mode due to the size of the block. Further, some networks provide some SIBs (for example SIB4 and SIB5 which relate to mobility) only in 3 dB coverage enhancement mode. Therefore, the inventors recognise that a terminal device operating in coverage enhancement mode will prefer to operate in either a lower level coverage enhancement mode or no coverage enhancement mode if possible. In other words, in the case above, a terminal device supporting 15 dB coverage enhancement such as a smart meter, would prefer to either operate in 3 dB coverage enhancement mode or with no coverage enhancement mode. This saves energy and would be supported by more networks and could enable additional behaviour such as mobility support. Some terminal devices may prefer to use mobility when in a situation that only a small level of coverage enhancement is needed, but prefer to use 15 dB coverage enhancement with no mobility rather than being out of coverage altogether FIG. 9 shows a flow chart 900 explaining the process by which a terminal device will operate in the most appropriate coverage enhancement mode (or even no coverage enhancement mode).

The process starts in step 902. The terminal device receives the initial system information in 904. The system information may include a MIB and SIB and/or SIBx as appropriate. The network will provide the initial system information such that can be received by all terminal devices in the cell. This means that the network will provide system information that can be read by terminal devices operating with a maximum level of coverage enhancement.

Within the initial system information, one or more thresholds are provided. These threshold values define the minimum power (for each level of coverage enhancement) at which the cell is considered suitable. This threshold information is similar to that defined currently as the Qrxlevmin which is currently provided in SIB1 for example. Of course, this is only an example and any kind of threshold identifying the minimum power at which the cell is considered suitable for each level of coverage enhancement is envisaged. The initial system information may only reference the location of further system information, with the thresholds being fixed, for example in the terminal device or in the standards specification.

In this specific case, SIB1 will initially provide the threshold value for normal coverage. In other words, SIB1 will include the threshold value for no coverage enhancement. Within SIB1, the remaining threshold levels for each of the supported coverage enhancement modes may also be provided. However, these values may be discrete threshold values or may be values relative to the no coverage enhancement threshold value (for example, threshold value for 3 dB coverage enhancement=threshold for no coverage enhancement—3 dB).

The terminal device retrieves the threshold values in step 906.

The terminal device then compares the measured signal strength (RSRP) against the threshold value for no coverage enhancement in step 908.

The terminal device determines whether the measured signal strength is lower than the threshold value for no coverage enhancement in step 910. If the result of the comparison is that the measured signal strength is lower, then the "yes" branch is followed. Otherwise, the "no" branch is followed. In the event that the "yes" branch is followed, the terminal device compares the measured signal strength against the threshold value for the first level of coverage enhancement. In this case, the terminal device compared the measured signal strength against the threshold value for the 3 dB level of coverage enhancement. This is step 912.

If the terminal device determines in step 914 that the measured signal strength is lower than the threshold value for the 3 dB level of coverage enhancement, the "yes" branch is followed. Otherwise, the "no" branch is followed.

In the event that the "yes" branch is followed, the next (in this case second) level of coverage enhancement will be tested. Specifically, in step 916, the next level of coverage enhancement is selected. The process repeats steps 912 and 916. In other words, the terminal device compares the measured signal strength against the threshold for the second level of coverage enhancement (for example 15 dB). This repeats until the measured signal strength is not less than the threshold value and then an appropriate level of coverage enhancement for that terminal device, and that is supported by the network, is selected. The no branch at step 914 is then followed.

When the "no" branch is followed from step 914, the process moves to step 920. The terminal device knows which level of coverage enhancement to use and therefore which SIB to retrieve. The selection of the appropriate level is performed in step 920 and the reading and retrieval of the appropriate SIB is performed in step 924. The reader is referred to FIGS. 6-8 regarding information explaining the selection of the SIB.

Referring back now to step 910, if the terminal device determines that the measured signal strength is not lower than the threshold for no coverage enhancement, the "no" branch is followed. This means that the terminal device will not operate using coverage enhancement and so will avoid receiving repeated SIBs thus saving energy.

The terminal device will select no coverage enhancement in step 918 and will read the SIB that is associated with no coverage enhancement in step 922. This SIB may be a modified SIB as explained above in FIGS. 6-8 if only certain features are required or may be an unmodified SIB.

Once the terminal device has read the appropriate SIB, the terminal device informs the network of the coverage enhancement mode upon which the terminal device operates. This may be sent using the PRACH as the terminal device requests certain resources from the network. Of course, other mechanisms for letting the network know such as a specific instruction sent over the air or otherwise is envisaged. This is performed in step 926. The process ends in step 928.

This process has a number of advantages. The terminal device can select the best level of coverage enhancement based on the terminal device capability and the support in the cell. By doing this energy consumption in the terminal device is achieved.

At the end of the process outlined in FIG. 9, the terminal device operates in a particular coverage enhancement mode.

This process may be repeated periodically to ensure that the terminal device operates in the most appropriate coverage enhancement mode.

However, in the event that the measured signal strength changes before the process is repeated due to mobility of the terminal device, or due to the dynamic radio conditions or even due to an incorrectly identified measured signal strength, the terminal device may not be able to receive the appropriate SIB. In this case, the terminal device will automatically operate in the next level of coverage enhancement and will notify the network appropriately.

For example, if the terminal device operates in the 3 dB coverage enhancement mode and then suddenly the dynamic radio conditions worsen to the extent that the 3 dB coverage enhancement SIB can no longer be received, the terminal device will begin operating in the 15 dB coverage enhancement mode (instead of the 3 dB coverage enhancement mode) and will receive the 15 dB coverage enhancement SIB transmitted at the increased repetition rate. The terminal device will notify the network of the change of operation mode as noted previously in FIG. 9. It is also envisaged that failure to receive the system information may initiate repeating the process described in FIG. 9.

Although the above describes the threshold values being provided by the network, it is envisaged that the threshold values may be provided to the terminal device by any appropriate mechanism, such as at manufacture (if the threshold values are set in a Standard) or over WiFi or by any appropriate means. Indeed the terminal device may receive an index to a table in which the threshold values are stored. This potentially means less data is transmitted if the index value is smaller than the threshold value.

Figure 10:
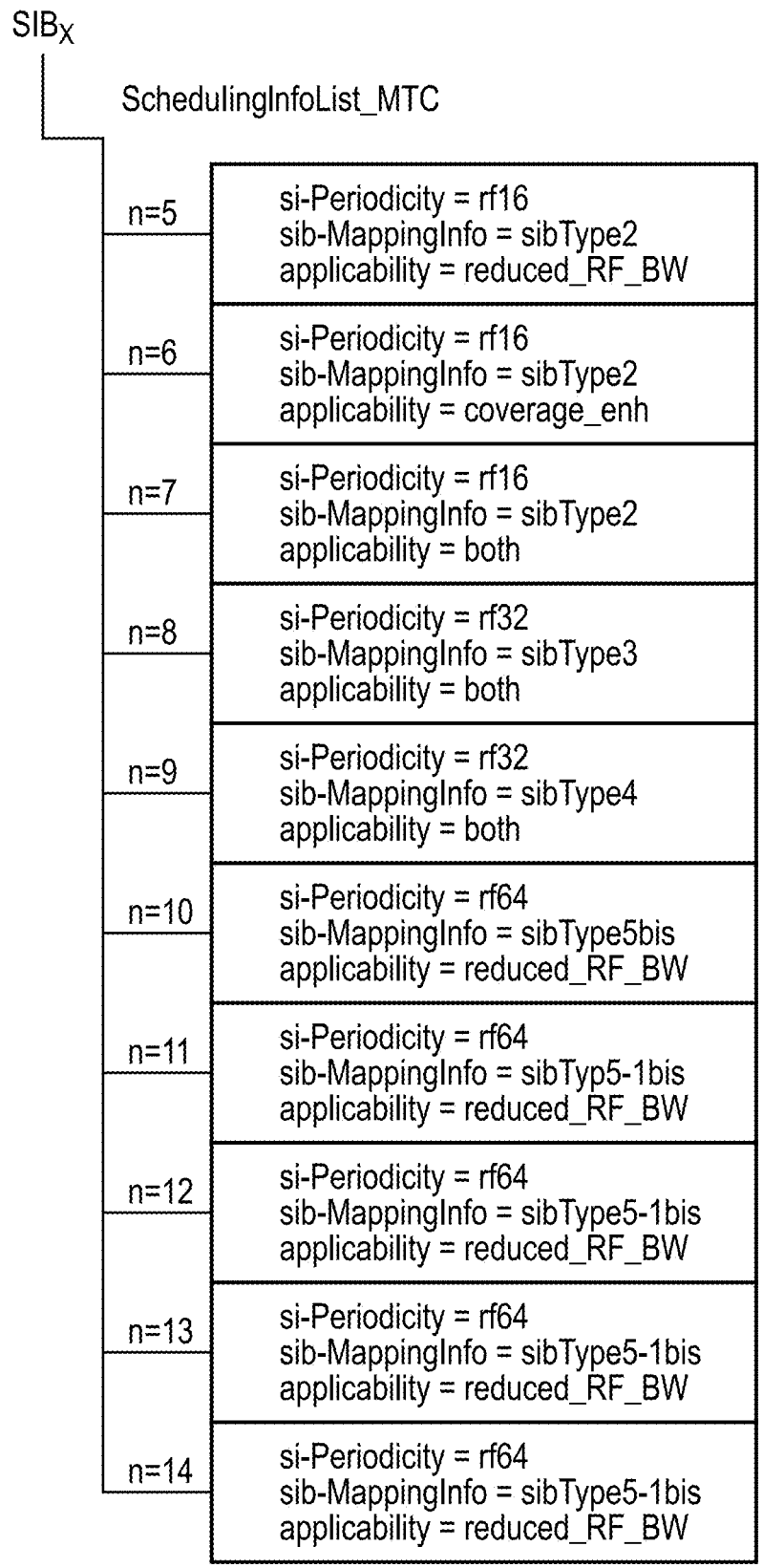
FIG. 10 shows a second block of system information containing scheduling information according to an example of the present disclosure.

Referring to FIG. 10, a second SIBx is shown according to the disclosure. As will be appreciated, the second SIBx is similar to the first SIBx shown in FIG. 6. However, the second SIBx also includes other information.

Specifically, the first SIBx and second SIBx both show the "si-periodicity" and the "sib-Mappinginfo" information. For explanation of this common information, the reader is referred to the description of FIG. 6 for explanation of this common information.

In addition, and differently to the first SIBx, the second SIBx shows information entitled "applicability".

The "applicability" information is used by the terminal device to determine whether or not the scheduling information at that entry in the list, and hence whether the SIB which is refers to, is intended for that terminal device. So, in the example of FIG. 10, there are three types of "applicability" information. The first type is "reduced_RF_BW". This means that, in the example of FIG. 10, the scheduling information at n=5 and the SIB it refers to is applicable to terminal devices that have a narrow band RF capability. In other words, any terminal device that has a wide band RF capability (such as a smartphone) will not use this part of the scheduling information and not decode the SIB which it refers to. However, a terminal device that only supports narrow band RF will know that this scheduling information is relevant and so will use the scheduling information and decode the SIB which it refers to. This arrangement ensures that only relevant data is decoded which reduces power consumption.

The second type of "applicability" information is "coverage_enh" information. This means that, in the example of FIG. 10, the scheduling information at n=6 is applicable to terminal devices that support coverage enhancement. In other words, any terminal device that does not support coverage enhancement will not use this part of the scheduling information and will not decode the SIB which it refers to. However, a terminal device that only supports coverage enhancement will know that this scheduling information is relevant and so will use the scheduling information and the SIB which it refers to. Again, this arrangement ensures that only relevant data is decoded which reduces power consumption.

The third type of "applicability" information is "both" information. This means that, in the example of FIG. 10, the scheduling information at n=7 is applicable to terminal devices that support both narrow band RF and are currently using coverage enhancement. In other words, any terminal device that does not both support narrow band RF and currently uses coverage enhancement will not use this part of the scheduling information and will not decode the SIB which it refers to. However, a terminal device that both supports narrow band RF and is currently using coverage enhancement will know that this scheduling information is relevant and so will use the scheduling information and the SIB which it refers to. Again, this arrangement ensures that only relevant data is decoded which reduces power consumption.

In FIG. 10 a reference is made to a new type of SIB5. This is shown at slots n=10 to n=14. Specifically, in the "sib-Mappinglnfo" reference is made to "sibType5bis" and "sibType5-1bis". The functionality of these will now be explained with reference to FIG. 11.

As the skilled person will appreciate, the known SIB5 includes information relating to the Inter-Frequency Carrier list. This list includes the frequencies upon which neighbour cells operate. In known SIBs this can include 8 different LTE frequencies and associated other information.

The inventors have identified that this is inefficient in that the terminal devices read information that relates to features or bands which may not be supported by the terminal device. This is particularly inefficient in the context of terminal devices with reduced capabilities. For example, in terminal devices that support narrow band RF, the size of the SIB5 block is difficult to receive as it is very large. Additionally in terminal devices that support coverage enhancement, large blocks, such as the SIB5 block, usually requires repeat reception and decoding by the terminal device. This means that reception of the SIB block takes more time and requires more power.

The inventors have recognised this problem and have addressed this as explained with reference to FIG. 11.

Figure 11:
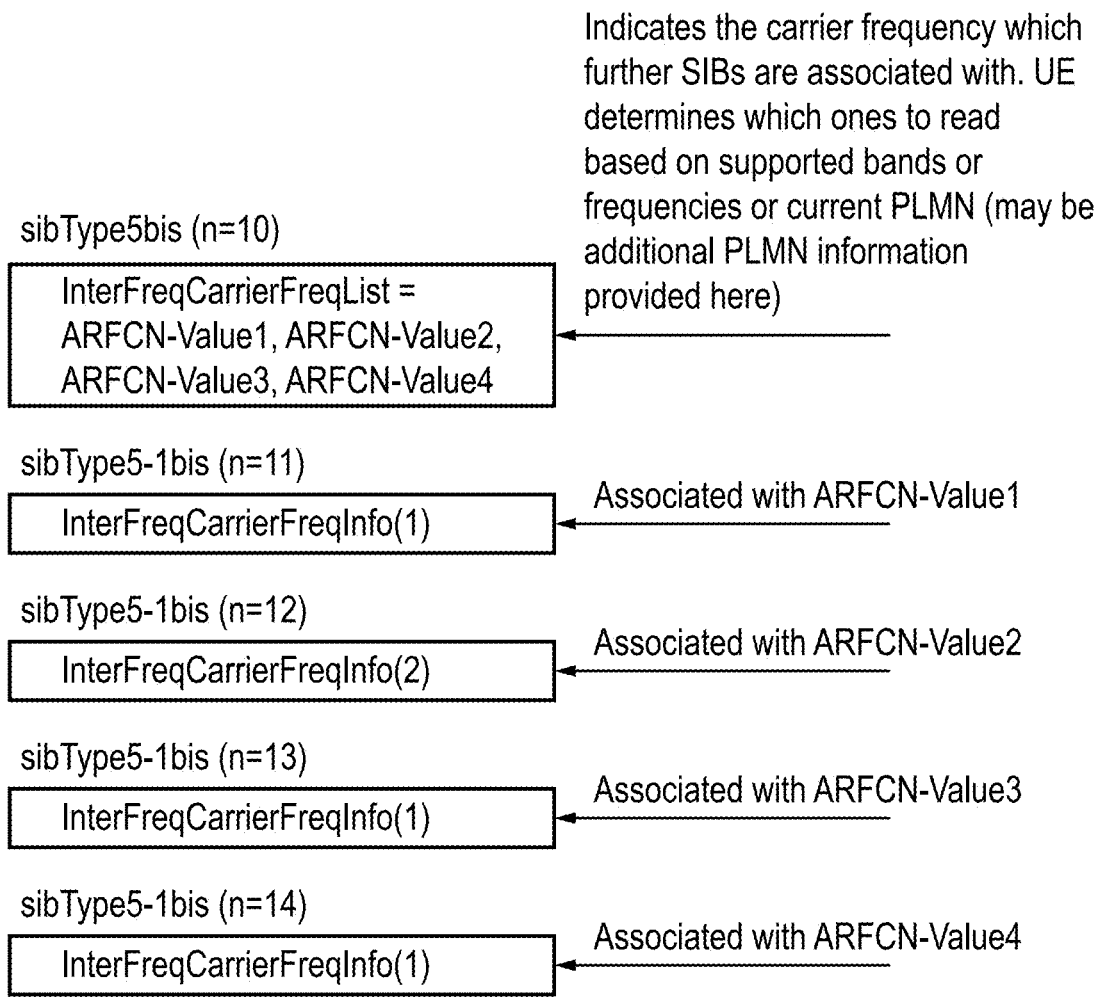
FIG. 11 shows a plurality of blocks of system information each containing frequency information according to an example of the present disclosure.

FIG. 11 shows an example of the content of the SIB5 block according to the disclosure. Sibtype5bis at n=10 includes an Inter Frequency Carrier Frequency List that is different to that known. Specifically, in the SibType5bis scheduling information in the example of FIG. 11, there are four further inter-frequency system information blocks identified. These are shown as entries in a list containing absolute radio frequency channel numbers—ARFCN-Value 1; ARFCN-Value 2; ARFCN-Value 3; and ARFCN-Value 4. As the skilled person appreciates, ARFCN in an LTE environment provides the frequency for uplink and downlink channels supported by an e-Node B. Of course, although four ARFCN values are shown, the skilled person will appreciate that the disclosure is not so limited. In fact, any number of ARFCN values may be provided which may be supported by the eNodeB.

The ARFCN values in sibType5bis indicate further system information blocks in which the inter-frequency selection parameters associated with that frequency channel are provided.

In the example of FIG. 11, the inter-frequency reselection parameters associated with ARFCN-Value 1 are provided in sibType5-1bis (at position n=11); the inter-frequency reselection parameters associated with ARFCN-Value 2 are provided in sibType5-1bis (at position n=12); the inter-frequency reselection parameters associated with ARFCN-Value 3 are provided in sibType5-1bis (at position n=13); and the inter-frequency reselection parameters associated with ARFCN-Value 4 are provided in sibType5-1bis (at position n=14).

As the skilled person will appreciate, the inter-frequency reselection parameters include information such as reselection thresholds, inter-frequency black cell list, inter-frequency cell list and the like. The inter-frequency reselection parameters are noted in FIG. 11 as the "InterFreqCarrierFreqInfo(1)" for ARFCN-Value 1; "InterFreqCarrierFreqInfo(2)" for ARFCN-Value 2; "InterFreqCarrierFreqInfo(3)" for ARFCN-Value 3; and "InterFreqCarrierFreqInfo(4)" for ARFCN-Value 4.

The interaction of a reduced capability terminal device and the SIB5 block of FIG. 11 will now be described with reference to the flow chart of FIG. 12.

Figure 12:
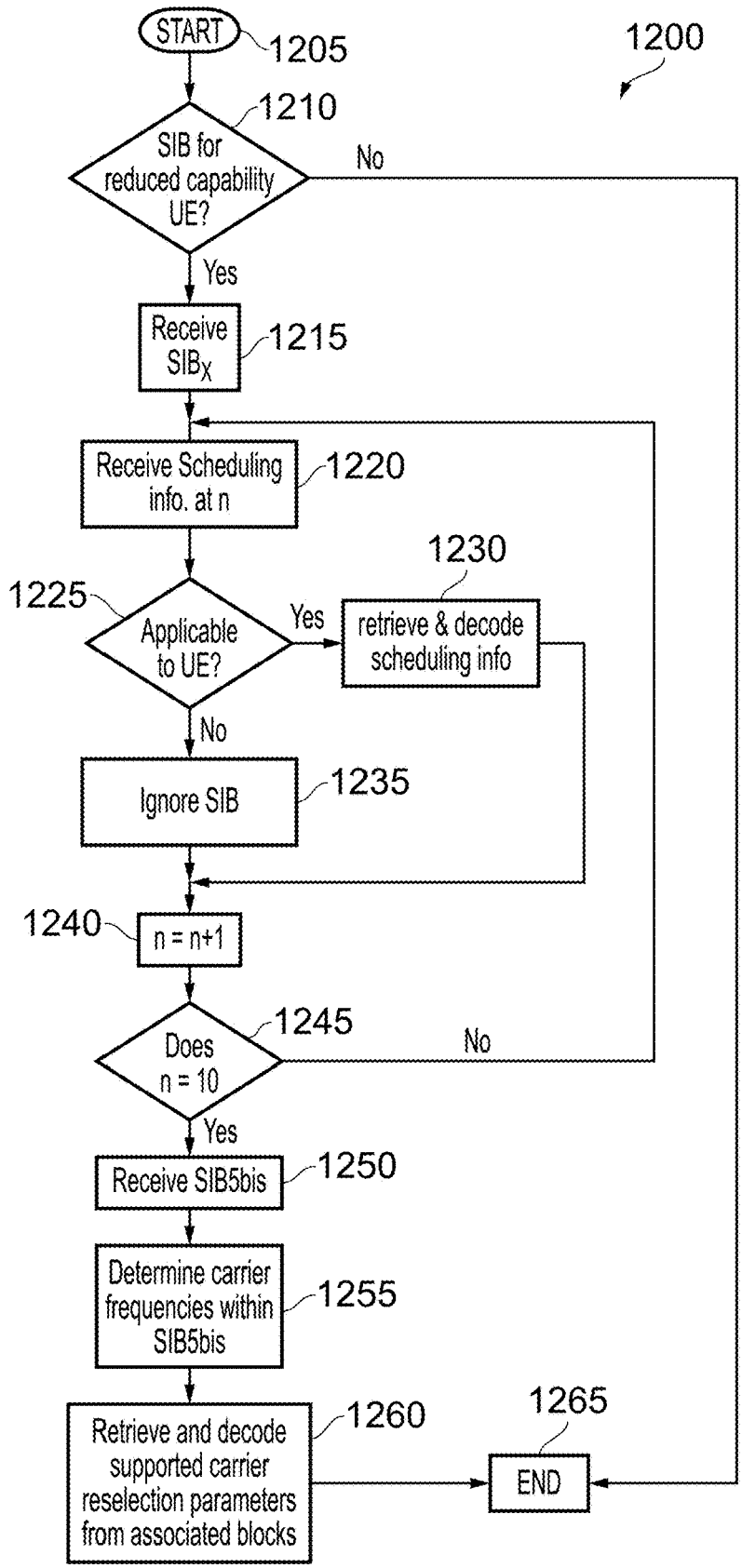
FIG. 12 shows a flow diagram explaining a process according to the present disclosure.

The reduced capability terminal device receives the sibType5bis information and will identify which ARFCN is supported by the device FIG. 12 shows a flow chart explaining the process performed by a terminal device according to embodiments. The process 1200 begins at step 1205. The terminal device receives either a Master Information Block (MIB) or SIB1 block that may include the marker indicating that the cell specifically supports reduced capability terminal devices. This decision is made at step 1210. If the cell does not specifically support reduced capability terminal devices, the "no" path is followed and the process ends at step 1265.

However, if the MIB or SIB1 does include the marker, the "yes" path is followed to step 1215. At this point, the reduced capability terminal device receives SIBx. The received SIBx may be the SIBx explained with reference to FIG. 6 or may be the SIBx explained with reference to FIG. 10. The following explanation assumes that the SIBx according to FIG. 10 is received. The process then moves to step 1220.

At step 1220, the scheduling information identified in time slot n is received. In the case of FIG. 10, the scheduling information at n=5 is received. The process moves to step 1220 where the reduced capability terminal device determines whether the scheduling information at n=5 is applicable to the terminal device. This is determined by the terminal device reviewing the "applicability" field in the scheduling information and comparing this to the capability of the terminal device.

In the event that the scheduling information is applicable to the terminal device, the "yes" path is followed. The scheduling information is retrieved and decoded by the terminal device and then at step 1230 the SIB referred to in the scheduling information is received and decoded. Alternatively, if the scheduling information is not applicable to the terminal device, the "no" path is followed. The SIB referred to in the scheduling information is then ignored (i.e. not received) at step 1235.

In either case, the process moves onto step 1240, where the time slot is incremented by 1.

The process then moves onto step 1245. At step 1254, the terminal device determines whether n=10. In other words, the terminal device determines whether the inter-frequency carrier frequency list in SIBType5bis is to be received. If the inter-frequency carrier frequency list is not to be received next, the process returns to step 1220 where the next scheduling information is received.

Alternatively, if the inter-frequency carrier frequency list is to be received next, the "yes" path is followed and the process moves to step 1250. At step 1250, the SIBType5bis scheduling information is received by the terminal device. The terminal device then determines which of the received inter-frequency carrier frequency list is supported by the reduced capability terminal device. For example, the terminal device may support only two of the four carriers. This is step 1255.

The process moves to step 1260 where the frequency reselection parameters of the supported carriers are retrieved and decoded from the appropriate value of n. For example, if ARFCN-Value 1 and ARFCN-Value 3 are supported, then the terminal device will retrieve the scheduling information from n=11 and n=13. The process then ends at step 1265.

By only retrieving the reselection parameters from the supported carriers, the reduced capability terminal device only decodes the reselection parameters which it may use. This reduces power consumption, as well as reduces the overall time to read system information hence speeds up initial access time, as parameters relating to only supported frequencies are received and decoded. In other words, in the present disclosure, the information associated with one frequency is provided in one system information block whereas with known system information blocks, the information for all frequencies is provided in one system information block. The decoding of only the system information containing information supported by the terminal device therefore reduces the amount of power used.

Moreover, although the process describes the sibType5bis system information block as containing only an inter-frequency carrier frequency list, the disclosure is not limited to this. Specifically, the sibType5bis schedule information block may include Public Land Mobile Network (PLMN) specific information. In many cases, the cell supports multiple operators and thus multiple PLMNs. As the skilled person appreciates, in this instance, network sharing may take place. This means that in the known SIB5, the frequency reselection parameters for all PLMNs, across all carrier frequencies are provided. Dedicated priorities within the terminal device then selects which PLMN and which frequency within that PLMN to use.

However, many reduced capability terminal devices such as smart meters which have little or no mobility do not require such multiple operator functionality. This is because these devices do not move from cell to cell. Therefore, in embodiments of the disclosure, the reduced capability terminal device may determine which system information block to retrieve and decode based on the PLMN information instead of or in addition to the supported frequency carriers. For example, for any one PLMN a system information block might be provided. This system information block may then contain multiple frequencies as well as other PLMN specific parameters.

Although the above describes the terminal device as receiving either a carrier frequency or PLMN value as a value associated with the frequency parameter of the wireless telecommunication network, the disclosure is not so limited. In fact, the system information block can contain any number of values associated with any parameter used within the wireless telecommunication network. For example, rather than carrier frequencies, any kind of frequency within a currently used supported band or a supported band that is not currently used. The terminal device determines which of the values it supports and will select and retrieve a further system information block based on the supported value. This allows the terminal device to only retrieve system information for values which the terminal device supports. This reduces energy consumption and is particularly useful where the terminal device has a reduced capability and/or is operating in coverage enhancement mode.

Figure 13:
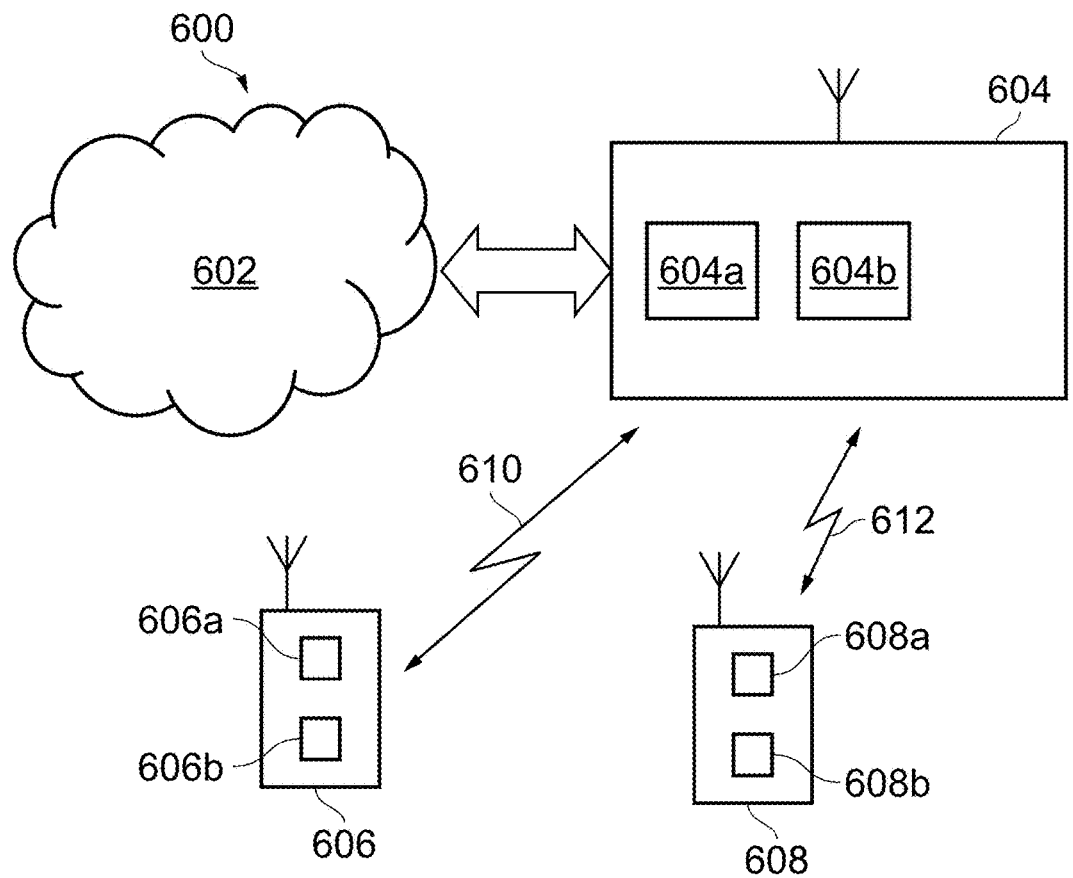
FIG. 13 schematically represents an adapted LTE-type wireless telecommunications system arranged in accordance with an example of the present disclosure.

FIG. 13 schematically shows a telecommunications system 600 according to an embodiment of the present disclosure. The telecommunications system 600 in this example is based broadly around an LTE-type architecture which supports virtual carrier operations such as discussed above. Many aspects of the operation of the telecommunications system 600 are known and understood and are not described here in detail in the interest of brevity. Operational aspects of the telecommunications system 600 which are not specifically described herein may be implemented in accordance with any known techniques, for example according to the current LTE-standards with modifications as appropriate to incorporate virtual carrier operation, such as disclosed in GB 2 487 906 [2], GB 2 487 908 [3], GB 2 487 780 [4], GB 2 488 613 [5], GB 2 487 757 [6], GB 2 487 909 [7], GB 2 487 907 [8], GB 2 487 782 [9], GB 2 497 743 [10] and GB 2 497 742 [11], the entire contents of which are incorporated herein by reference.

The telecommunications system 600 comprises a core network part (evolved packet core) 602 coupled to a radio network part. The radio network part comprises a base station (evolved-nodeB) 604 coupled to a plurality of terminal devices. In this example, two terminal devices are shown, namely a first terminal device 606 and a second terminal device 608. It will of course be appreciated that in practice the radio network part may comprise a plurality of base stations serving a larger number of terminal devices across various communication cells. However, only a single base station and two terminal devices are shown in FIG. 13 in the interests of simplicity.

As with a conventional mobile radio network, the terminal devices 606, 608 are arranged to communicate data to and from the base station (transceiver station) 604. The base station is in turn communicatively connected to a serving gateway, S-GW, (not shown) in the core network part which is arranged to perform routing and management of mobile communications services to the terminal devices in the telecommunications system 600 via the base station 604. In order to maintain mobility management and connectivity, the core network part 602 also includes a mobility management entity (not shown) which manages the enhanced packet service, EPS, connections with the terminal devices 606, 608 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 602 to an external packet data network, for example the Internet. As noted above, the operation of the various elements of the communications system 600 shown in FIG. 13 may be broadly conventional, for example in accordance with established telecoms standards and the principles set out in the referenced documents mentioned herein, apart from where modified to provide functionality in accordance with embodiments of the present disclosure as discussed herein.

In this example, it is assumed the first terminal device 606 is a conventional smartphone type terminal device communicating with the base station 604 in a conventional manner.

This conventional terminal device 606 comprises a transceiver unit 606a for transmission and reception of wireless signals and a processor unit (controller unit) 606b configured to control the device 606. The processor unit 606b may comprise a processor unit which is suitably configured/programmed to provide the desired functionality using conventional programming/configuration techniques for equipment in wireless telecommunications systems. The transceiver unit 606a and the processor unit 606b are schematically shown in FIG. 10 as separate elements. However, it will be appreciated that the functionality of these units can be provided in various different ways, for example using a single suitably programmed general purpose computer, or suitably configured application-specific integrated circuit(s)/circuitry. As will be appreciated the conventional terminal device 606 will in general comprise various other elements associated with its operating functionality.

In this example, it is assumed the second terminal device 608 is a machine-type communication (MTC) terminal device 604 adapted to operate in a virtual carrier (VC) mode in accordance with embodiments of the present disclosure when communicating with the base station 604. As discussed above, machine-type communication terminal devices can in some cases be typically characterised as semi-autonomous or autonomous wireless communication devices communicating small amounts of data. Examples include so-called smart meters which, for example, may be located in a customer's house and periodically transmit information back to a central MTC server data relating to the customer's consumption of a utility such as gas, water, electricity and so on. MTC devices may in some respects be seen as devices which can be supported by relatively low bandwidth communication channels having relatively low quality of service (QoS), for example in terms of latency. It is assumed here the MTC terminal device 608 in FIG. 9 is such a device.

The MTC device 608 comprises a transceiver unit 608a for transmission and reception of wireless signals and a processor unit (controller unit) 608b configured to control the MTC device 608. The processor unit 608b may comprise various sub-units for providing functionality in accordance with some embodiments of the present disclosure as explained further herein. These sub-units may be implemented as discrete hardware elements or as appropriately configured functions of the processor unit. Thus the processor unit 608b may comprise a processor which is suitably configured/programmed to provide the desired functionality described herein using conventional programming/configuration techniques for equipment in wireless telecommunications systems. The transceiver unit 608a and the processor unit 608b are schematically shown in FIG. 10 as separate elements for ease of representation. However, it will be appreciated that the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the MTC device 608 will in general comprise various other elements associated with its operating functionality in accordance with established wireless telecommunications techniques.

The base station 604 comprises a transceiver unit 604a for transmission and reception of wireless signals and a processor unit (controller unit) 604b configured to control the base station 604 to operate in accordance with embodiments of the present disclosure as described herein. The processor unit 606b may again comprise various sub-units for providing functionality in accordance with embodiments of the present disclosure as explained further below. These sub-units may be implemented as discrete hardware elements or as appropriately configured functions of the processor unit. Thus, the processor unit 604b may comprise a processor which is suitably configured/programmed to provide the desired functionality described herein using conventional programming/configuration techniques for equipment in wireless telecommunications systems. The transceiver unit 604a and the processor unit 604b are schematically shown in FIG. 13 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 604 will in general comprise various other elements associated with its operating functionality in accordance with established wireless telecommunications techniques.

Thus, the base station 604 is configured to communicate data with both the conventional terminal device 606 and the terminal device 608 according to an embodiment of the disclosure over respective communication links 610, 612. The communication link 610 for communications between the base station 604 and the conventional terminal device 606 is supported by a host carrier (e.g. potentially making use of the full range of transmission resources schematically represented in FIG. 4). The communication link 612 for communications between the base station 604 and the reduced-capability MTC terminal device 608 is supported by a virtual carrier (e.g. making use of resources within a restricted subset of frequency resources such as the virtual carrier schematically represented in FIG. 4). Communications between the MTC terminal device 608 and the base station 604 may generally be based on any of the previously proposed schemes for virtual carrier operation with modification as described herein to provide functionality in accordance with certain embodiments of the disclosure. For example, the MTC terminal device 608 may operate such that all control-plane and user-plane signalling from the base station 604 which is addressed to the terminal device 608 is made within the subset of frequency resources (OFDM carriers) allocated to the virtual carrier provided for the terminal device 608. Alternatively, control-plane signalling from the base station 604 which is addressed to the terminal device 608 may be made within the full-bandwidth of the control region 300 represented in FIG. 4, with higher-layer data (user-plane data) being communicated within the restricted frequency resources (OFDM carriers) allocated to the virtual carrier provided for the terminal device 608.

Finally, although the foregoing has described the terminal device as a smart watch as a wearable device, any type of wearable device is envisaged. For example, according to present principles, the wearable device may be smart glasses, or a fitness band. Further, the device may be located in a vehicle such as a car or van or a boat.

Embodiments of the present disclosure can be exemplified by the following numbered paragraphs.

1. A method of operating a terminal device in a wireless telecommunications network, comprising; receiving a system information block containing a list of a plurality of different values of a parameter used in the wireless telecommunication network; determining one or more parameter values in the list which is supported within the terminal device; and receiving a system information block associated with the one or more supported parameter values from one or more other system information blocks associated with non-supported parameter values.

2. A method according to claim 1, wherein the parameter value is the frequency using which the terminal device is capable of communicating with the wireless telecommunications network.

3. A method according to claim 1 wherein the parameter value is a public land mobile network value.

4. A method according to claim 1, 2 or 3 comprising: operating the terminal device in a coverage enhancement mode.

5. A system information block for use in a wireless telecommunications network, the system information block comprising a list of a plurality of different values of a parameter used in the wireless telecommunications network; and a location of a further system information block associated with each different value of the parameter.

6. A terminal device for use in a wireless telecommunications network, the terminal device comprising transceiver circuitry configured to communicate with the telecommunications network and control circuitry configured to control the transceiver circuitry to receive a system information block containing a list of a plurality of different values of a parameter used in the wireless telecommunication network; the control circuitry being configured to determine one or more parameter values in the list which is supported within the terminal device; and to control the transceiver circuitry to further receive a system information block associated with the one or more supported parameter values from one or more other system information blocks associated with non-supported parameter values.

7. A terminal device according to claim 6, wherein the parameter value is the frequency using which the terminal device is capable of communicating with the wireless telecommunications network.

8. A terminal device according to claim 6 wherein the parameter value is a public land mobile network value.

9. A terminal device according to claim 6, 7 or 8 wherein the control circuitry is configured to operate the terminal device in a coverage enhancement mode.

10. A base station for use in communicating with a terminal device in a wireless telecommunications network, the base station comprising transceiver circuitry configured to communicate with the terminal device and control circuitry configured to control the transceiver circuitry to transmit a system information block according to claim 5.

11. A wireless telecommunication system comprising a base station in communication with at least one terminal device according to claim 6, 7 or 8.

12. A computer program product comprising computer readable code which, when loaded onto a computer, configures the computer to perform a method according to claim 1, 2, 3 or 4.

REFERENCES

[1] ETSI TS 122 368 V11.6.0 (2012-09)/3GPP TS 22.368 version 11.6.0 Release 11)
[2] GB 2 487 906 (UK patent application GB 1101970.0)
[3] GB 2 487 908 (UK patent application GB 1101981.7)
[4] GB 2 487 780 (UK patent application GB 1101966.8)
[5] GB 2 488 513 (UK patent application GB 1101983.3)
[6] GB 2 487 757 (UK patent application GB 1101853.8)
[7] GB 2 487 909 (UK patent application GB 1101982.5)

[8] GB 2 487 907 (UK patent application GB 1101980.9)
[9] GB 2 487 782 (UK patent application GB 1101972.6)
[10] GB 2 497 743 (UK patent application GB 1121767.6)
[11] GB 2 497 742 (UK patent application GB 1121766.8)
[12] Holma H. and Toskala A, "LTE for UMTS OFDMA and SC-FDMA based radio access", John Wiley and Sons, 2009
[13] ETSI TS 136 331 V11.4.0 (2013-07)/3GPP TS 36.331 version 11.4.0 Release 11

The invention claimed is:

1. A method of operating a terminal device in a wireless telecommunications network, comprising:
    receiving, by the terminal device, a first system information block containing a list of a plurality of different values of a parameter used in the wireless telecommunication network and scheduling information, the list including one or more supported parameter values that are supported within the terminal device and one or more non-supported parameter values that are not supported within the terminal device;
    determining, by the terminal device, the one or more parameter values in the list which are supported within the terminal device; and
    receiving, based on the scheduling information by the terminal device, a second system information block associated with the one or more supported parameter values from one or more other system information blocks associated with the non-supported parameter values.

2. The method according to claim 1, wherein the parameter value is a frequency using which the terminal device is capable of communicating with the wireless telecommunications network.

3. The method according to claim 1, wherein the parameter value is a public land mobile network value.

4. The method according to claim 1, comprising:
    operating the terminal device in a coverage enhancement mode.

5. The method according to claim 1, further comprising:
    receiving instructions to replace or remove a part of the scheduling information to generate modified scheduling information, wherein the modified scheduling information indicates to the terminal device whether to receive one or more other system information blocks included in the modified scheduling information and associated with an inter-frequency parameter selected by the terminal device; and
    scheduling communication of the one or more other system information blocks with the wireless telecommunications network and on the selected inter-frequency parameter, by the terminal device.

6. The method according to claim 1, further comprising:
    decoding, by the terminal device from the second system information block, only the one or more parameters values in the list which are determined by the terminal device to be supported within the terminal device.

7. The method according to claim 1, wherein the one or more parameter values in the list correspond to absolute radio frequency channel numbers.

8. The method according to claim 1, wherein the one or more parameter values in the list indicate further system information blocks in which selection parameters associated with corresponding absolute radio frequency channel numbers are provided.

9. A terminal device for use in a wireless telecommunications network, the terminal device comprising:
    transceiver circuitry configured to communicate with the telecommunications network; and
    control circuitry configured to control the transceiver circuitry to receive a first system information block containing a list of a plurality of different values of a parameter used in the wireless telecommunication network and scheduling information, the list including one or more supported parameter values that are supported within the terminal device and one or more non-supported parameter values that are not supported within the terminal device;
    the control circuitry being configured to determine the one or more parameter values in the list which are supported within the terminal device, and to control the transceiver circuitry to further receive, based on the scheduling information, a second system information block associated with the one or more supported parameter values from one or more other system information blocks associated with non-supported parameter value.

10. The terminal device according to claim 9, wherein the parameter value is a frequency using which the terminal device is capable of communicating with the wireless telecommunications network.

11. The terminal device according to claim 9, wherein the parameter value is a public land mobile network value.

12. The terminal device according to claim 9, wherein the control circuitry is configured to operate the terminal device in a coverage enhancement mode.

13. The terminal device according to claim 9, wherein:
    the control circuitry further configured to receive instructions to replace or remove a part of the scheduling information to generate modified scheduling information, wherein the modified scheduling information indicates to the terminal device whether to receive one or more other system information blocks included in the modified scheduling information and associated with an inter-frequency parameter selected by the terminal device; and
    scheduling communication of the one or more other system information blocks with the wireless telecommunications network and on the selected inter-frequency parameter, by the terminal device.

14. The terminal device according to claim 9, wherein:
    the control circuitry is further configured to decode, from the second system information block, only the one or more parameters values in the list which are determined by the control circuitry to be supported within the terminal device.

15. A base station for use in communicating with a terminal device in a wireless telecommunications network, the base station comprising:
    transceiver circuitry configured to communicate with the terminal device; and
    control circuitry configured to control the transceiver circuitry to transmit a system information block including a list of a plurality of different values of a parameter used in the wireless telecommunications network, and a location of a further system information block associated with each different value of the parameter, the list including one or more supported parameter values that are supported within the terminal device, as determined by the terminal device, and one or more non-supported parameter values that are not supported within the terminal device, as determined by the terminal device.

16. The base station according to claim 15, wherein:
transmitting instructions to replace or remove a part of the scheduling information to generate modified scheduling information, wherein the modified scheduling information indicates to the terminal device whether to receive one or more other system information blocks included in the modified scheduling information and associated with an inter-frequency parameter selected by the terminal device; and
the terminal device schedules communication of the one or more other system information blocks with the wireless telecommunications network and on the selected inter-frequency parameter, by the terminal device.

17. The base station according to claim 15, wherein:
the terminal device decodes, from the second system information block, only the one or more parameters values in the list which are determined by the terminal device to be supported within the terminal device.

18. A method of operating a terminal device in a wireless telecommunications network, comprising:
receiving, by the terminal device, a first system information block containing a list of a plurality of different values of a parameter used in the wireless telecommunication network and scheduling information, the list including one or more supported parameter values that are supported within the terminal device and one or more non-supported parameter values that are not supported within the terminal device;
determining, by the terminal device, based on whether the scheduling information is applicable to a capability of the terminal device, to ignore the non-supported parameters in the first system information block or read from the first system information block the one or more parameter values in the list which are supported within the terminal device; and
receiving, based on the determining by the terminal device, a second system information block associated with the one or more supported parameter values and the one or more non-supported parameter values.

19. The method according to claim 1, wherein the one or more parameter values in the list indicate further system information blocks in which inter-frequency parameters are provided.

\* \* \* \* \*